US011998091B2

(12) United States Patent
Lui et al.

(10) Patent No.: US 11,998,091 B2
(45) Date of Patent: Jun. 4, 2024

(54) WATCH BAND WITH BRAIDED STRANDS

(71) Applicant: Apple Inc., Cupertino, CA (US)

(72) Inventors: Timothy S. Lui, San Jose, CA (US); Osamu Yabe, Mountain View, CA (US); Zebinah P. Masse, San Jose, CA (US); Clayton J. McCoy, San Francisco, CA (US); Benjamin A. Stevenson, Oakland, CA (US); Hsiang Hung Chen, New Taipei (TW)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/143,546

(22) Filed: May 4, 2023

(65) Prior Publication Data

US 2023/0270215 A1 Aug. 31, 2023

Related U.S. Application Data

(63) Continuation of application No. 16/844,942, filed on Apr. 9, 2020, now Pat. No. 11,666,124.

(Continued)

(51) Int. Cl.
*A44C 5/14* (2006.01)
*A44C 5/00* (2006.01)
(Continued)

(52) U.S. Cl.
CPC ............ *A44C 5/145* (2013.01); *A44C 5/0053* (2013.01); *A44C 5/0069* (2013.01); *A44C 5/147* (2013.01); *D04C 1/06* (2013.01); *G04B 37/0008* (2013.01)

(58) Field of Classification Search
CPC ......... A44C 5/185; A44C 5/145; A44C 5/147; A44C 5/0053; A44C 5/14; A44C 5/0069;
(Continued)

(56) References Cited

U.S. PATENT DOCUMENTS 2,833,128 A 5/1958 Del Noce
2,948,182 A 8/1960 Huppertsberg
(Continued)

FOREIGN PATENT DOCUMENTS

CN 201088196 Y 7/2008
CN 105361367 A 3/2016
(Continued)

OTHER PUBLICATIONS

Chinese Office Action from Chinese Patent Application No. 202010644563.X, dated Mar. 24, 2022.

(Continued)

*Primary Examiner* — Edwin A. Leon
(74) *Attorney, Agent, or Firm* — BAKERHOSTETLER

(57) ABSTRACT

A stretchable watch band can include braided strands that provide a comfortable fit around the wrist of the user. The watch band can stretch and conform to the user based on the elasticity within each strand and based on the ability of the strands to move relative to each other. End sections of the watch band can include attachment elements that securely connect the watch band to a housing of the watch. The end sections can be configured to releasable connect to the housing in a manner that is reliable and easy for a user. Additionally, the watch band can provide a smooth transition from the size and/or shape of the housing to a size and/or shape of a continuous section of the watch band. Additionally, the watch band can conceal portions thereof other than the braided strands when connected to the housing of the watch.

20 Claims, 19 Drawing Sheets

Related U.S. Application Data

(60) Provisional application No. 62/906,638, filed on Sep. 26, 2019, provisional application No. 62/834,172, filed on Apr. 15, 2019.

(51) Int. Cl.
*D04C 1/06* (2006.01)
*G04B 37/00* (2006.01)

(58) Field of Classification Search
CPC ... D04C 1/06; G04B 37/1486; G04B 37/0008
See application file for complete search history.

(56) References Cited

U.S. PATENT DOCUMENTS

| | | | | |
|---|---|---|---|---|
| 3,492,809 | A | 2/1970 | Gisiger-Lusa | |
| 3,603,493 | A | 9/1971 | Frohlich | |
| 4,846,230 | A | 7/1989 | Mock et al. | |
| 5,156,022 | A | 10/1992 | Altman | |
| 7,553,069 | B2 | 6/2009 | Gibbons | |
| 8,613,544 | B2 | 12/2013 | Kitahara et al. | |
| 8,677,515 | B2 | 3/2014 | Ishihara et al. | |
| 10,058,148 | B1 | 8/2018 | Wittenberg et al. | |
| 10,123,593 | B2 * | 11/2018 | Perkins | A44C 5/2085 |
| D836,016 | S | 12/2018 | Billington | |
| 10,709,213 | B2 | 7/2020 | Zeng | |
| 11,419,396 | B2 | 8/2022 | Xue | |
| 2005/0083788 | A1 | 4/2005 | Ogletree | |
| 2011/0203533 | A1 | 8/2011 | Hurwitz | |
| 2015/0068651 | A1 | 3/2015 | Tekulve | |
| 2016/0037870 | A1 | 2/2016 | Perkins et al. | |
| 2016/0037876 | A1 | 2/2016 | Perkins et al. | |
| 2016/0037877 | A1 | 2/2016 | Perkins et al. | |
| 2016/0037878 | A1 | 2/2016 | Yabe | |
| 2016/0069371 | A1 | 3/2016 | Chen | |
| 2016/0316839 | A1 | 11/2016 | King | |
| 2017/0215529 | A1 | 8/2017 | Steve | |
| 2017/0340070 | A1 | 11/2017 | Bloch | |
| 2019/0191828 | A1 | 6/2019 | Wang | |
| 2019/0332062 | A1 * | 10/2019 | Grand | A44C 5/14 |

FOREIGN PATENT DOCUMENTS

| | | | |
|---|---|---|---|
| CN | 205358486 | U | 7/2016 |
| CN | 207055004 | U | 3/2018 |
| CN | 108095254 | A | 6/2018 |
| CN | 109846156 | A | 6/2019 |
| FR | 658462 | | 6/1929 |
| FR | 1227276 | | 8/1960 |
| JP | S 54-119372 | U | 8/1979 |
| JP | S 58-109005 | | 6/1983 |
| JP | S 63-197103 | | 8/1988 |
| JP | 3203984 | U | 5/2016 |
| KR | 20-0486509 | Y1 | 6/2018 |
| TW | M529866 | U | 10/2016 |

OTHER PUBLICATIONS

Chinese Office Action from Chinese Patent Application No. 202010644563.X, dated Mar. 29, 2023.

Great Britain Office Action from Great Britain Patent Application No. 2300975.6. dated Feb. 1, 2023, 6 pages.

Great Britain Office Action from Great Britain Patent Application No. 2116380.3, dated Aug. 19, 2022, 6 pages.

International Search Report and Written Opinion from PCT/US2020/027782 dated Jul. 3, 2020, 14 pages.

Japanese Notice of Allowance from Japanese Patent Application No. 2021-561038, dated Feb. 10, 2023, 5 pages including machine-generated English language translation.

Japanese Office Action from Japanese Patent Application No. 2021-561038, dated Oct. 28, 2022, 6 pages including English language translation.

Korean Notice of Allowance from Korean Patent Application No. 10-2020-0085485, dated May 27, 2022, 3 pages including English language translation.

Korean Office Action from Korean Patent Application No. 10-2020-0085485, dated Nov. 25, 2021, 13 pages including English language translation.

Korean Office Action from Korean Patent Application No. 10-2022-105603, dated Nov. 17, 2022, 8 pages including English language summary.

Great Britain Intention to Grant from Great Britain Patent Application No. 2300975.6. dated Jul. 20, 2023, 2 pages.

Japanese Office Action from Japanese Patent Application No. 2023-038862, dated Mar. 1, 2024, 6 pages including English language translation.

Korean Office Action from Korean Patent Application No. 10-2023-0090264, dated Mar. 18, 2024, 7 pages including machine-generated English language translation.

* cited by examiner

WATCH BAND WITH BRAIDED STRANDS

CROSS-REFERENCE TO RELATED APPLICATIONS

This application is a continuation of U.S. patent application Ser. No. 16/844,942, entitled "WATCH BAND WITH BRAIDED STRANDS," filed on Apr. 9, 2020, which claims the benefit of U.S. Provisional Application No. 62/834,172, entitled "WATCH BAND WITH BRAIDED STRANDS," filed Apr. 15, 2019, and U.S. Provisional Application No. 62/906,638, entitled "WATCH BAND WITH BRAIDED STRANDS," filed Sep. 26, 2019, the entirety of each of which is incorporated herein by reference.

TECHNICAL FIELD

The present description relates generally to securement of wearable devices, and, more particularly, to watch bands with braided strands.

BACKGROUND

Some electronic devices may be removably attached to a user. For example, a wristwatch or fitness/health tracking device can be attached to a user's wrist by wrapping around the wrist. In many cases, watch bands may have discrete fit adjustment increments available. For example, some bands have an incrementally user-adjustable size (e.g., a buckling clasp, pin and eyelet, etc.) whereas other bands have a substantially fixed size, adjustable only with specialized tools and/or expertise (e.g., folding clasp, deployment clasp, snap-fit clasp, etc.). Other bands may be elasticated expansion-type bands that stretch to fit around a user's wrist. The degree of comfort and securement of the electronic device can depend on the function and arrangement of the watch band.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
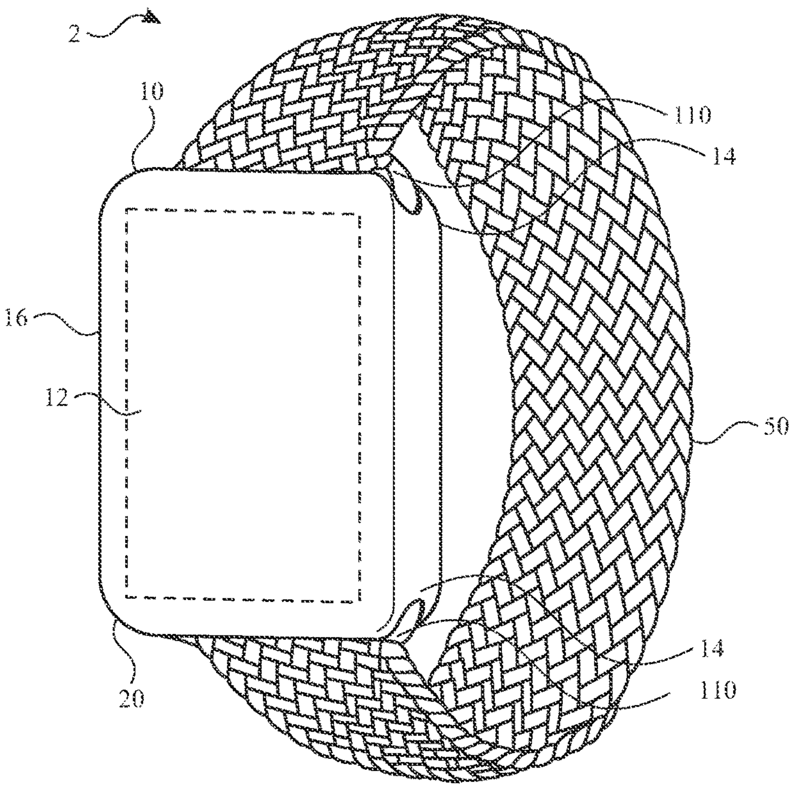
FIG. 1 is a perspective view of a watch with a watch band, in accordance with some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

An electronic device, such as a wristwatch or fitness/health tracking device, can be attached to a user's wrist by a watch band. It can be desirable to maintain a secure attachment to the wrist so that the electronic device does not shift excessively or slip off of the user. Securement of the electronic device against the user can also be important to the function of electronic components, such as biometric sensors. Additionally, it can be desirable to maximize the comfort of the user while wearing the electronic device. Often, a secure attachment can apply an undesirable amount of force on the wrist of the user. In many cases, conventional watch bands may catch, pinch, or pull a user's hair or skin during use if the band is overly tight. In other cases, watch bands may slide along a user's wrist, turn about a user's wrist, or may be otherwise uncomfortable or bothersome to a user if the band is overly loose. These problems can be exacerbated during periods of heightened activity, such as while running or playing sports.

Furthermore, adjusting the size or fit of conventional watch bands often requires multiple steps, specialized tools, and/or technical expertise. Sizing options available to a user may be insufficient to obtain a proper fit. The fit may be different and/or may be perceived to be different given certain environmental (e.g. temperature, humidity) or biological conditions (e.g., sweat, inflammation). Some wearable electronic devices may be multi-purpose devices, providing both fitness/health tracking and timekeeping functionality. Accordingly, a user may prefer the fit of a watch to vary with use. For example, a user may prefer a looser fit in a timekeeping mode and a tighter fit in a fitness/health tracking mode. As a result, users of conventional wristwatches and/or fitness/health tracking devices may be required to frequently adjust between fixed, discrete sizing increments.

Embodiments of the present disclosure provide a stretchable watch band having braided strands that provide a comfortable fit around the wrist of the user. The watch band can stretch and conform to the user based on the elasticity within each strand and based on the ability of the strands to move relative to each other. This allows the watch band to take on a wide variety of different sizes as needed and in response to external forces. The watch band also distributes forces evenly across a broad area on the wrist of the user. Such adaptability is provided without requiring the user to actively adjust the watch band (e.g., with clasps, etc.).

While a significant portion of the watch band can be stretchable and flexible, end sections of the watch band can include attachment elements that securely connect the watch band to a housing of the watch. The end sections can be configured to releasable connect to the housing in a manner that is reliable and easy for a user. Additionally, the watch band can provide a smooth transition from the size and/or shape of the housing to a size and/or shape of a continuous section of the watch band. For example, the watch been can taper from a wider section at the housing to a narrower section extending away from the housing. The taper section can be maintained despite movement of the strands while bending, flexing, and stretching. Additionally, the watch band can conceal portions thereof other than the braided strands when connected to the housing of the watch. In the way, the braided strands can be the only portions of the watch band that can be seen, thereby providing an aesthetically pleasing appearance.

These and other embodiments are discussed below with reference to FIGS. 1-16. However, those skilled in the art will readily appreciate that the detailed description given herein with respect to these figures is for explanatory purposes only and should not be construed as limiting.

According to some embodiments, for example as shown in FIG. 1, a watch 2 includes a watch body 10 that is worn on a wrist with a watch band 50. The watch body 10 can be portable and also attached to other body parts of the user or to other devices, structures, or objects. The watch band 50 can be flexible and encircle at least a portion of the wrist of a user. By securing the watch body 10 to the person of the user, the watch band 50 provides security and convenience. In some embodiments, the watch body 10 includes a display 12 and a housing 16 for containing components.

While reference is made to a watch, it will be understood that aspects of the present disclosure can apply to a variety of watches and other consumer products, including wearable consumer products, electronic devices, and portable computing devices. Examples of other devices to which aspects of the present disclosure can apply include cell phones, smart phones, tablet computers, laptop computers, timekeeping devices, computerized glasses and other wearable devices navigation devices, sports devices, accessory devices, health-monitoring devices, medical devices, wristbands, bracelets, jewelry, and/or the like.

In one example, the watch 2 can have various functionalities and/or capabilities described above (e.g., computing, communication, timekeeping or time display, health monitoring, health tracking and/or health output functionalities/capabilities, etc.). In one example, the watch 2 is a wrist worn multifunctional device and can include various components and/or modules. In another example, the watch 2 can act as an extension of another electronic device (or vice versa). For example, while the watch 2 is used as a wrist-worn device, it can interact with a phone that is carried by (e.g., in a pocket) or otherwise associated with the user. By further example, the watch 2 can include a connection system, either wired or wireless, that enables the consumer product to interface with other devices. These other devices can include laptop computers, mobile phones, tablet computers, exercise equipment, electronic glasses and the like.

The watch 2 can include a housing 16. The housing 16 serves to define an outer periphery 20 of the watch body 10 as well as to support the internal components of the watch 2 in their assembled position. That is, the housing 16 can enclose and support various internal components (including for example integrated circuit chips, processors, memory devices and other circuitry) to provide computing and functional operations for the watch 2. The housing 16 can also help define the shape or form of the watch 2. That is, the outer periphery 20 of the housing 16 can embody the outward physical appearance of the watch 2. As such, it can include various ornamental and mechanical features that improve the aesthetical appearance and tactile feel of the device.

As shown in FIG. 1, the housing 16 can have a rectilinear shape. However, the housing 16 can be configured in a variety of shapes. The housing 16 can also have a substantially planar or flat top surface on which a display 12 can be positioned and a substantially planar or flat bottom surface. Although the top surface of the housing 16 and the bottom surface of the housing 16 can be substantially planar, the transition between the top surface of the housing 16 and one or more sidewalls of the housing can be curved. Put another way, the transition from the top surface to the one or more sidewalls of the housing (e.g., including a side in which the channel 14 is positioned) can be rounded such that a smooth transition is present between the top surface and the sides of the housing 16. Likewise, the transition from the bottom surface of the housing 16 to one or more sidewalls of the housing 16 can have a similar rounded shape and transition.

The housing 16, which can sometimes be referred to as a case or enclosure, can be formed of plastic, glass, ceramics, fiber composites, metal (e.g., stainless steel, aluminum, titanium, magnesium), other suitable materials, or a combination of these materials. Further, the surface of the housing 16 can be formed from any suitable material, including aluminum, steel, gold, silver and other metals, metal alloys, ceramics, wood, plastics, various types of glass and combinations thereof, and the like.

In some embodiments, the watch 2 can include one or more I/O systems. For example, the watch 2 can include the display 12 configured to output various information about the watch 2. The display 12 can also output data from applications and other programs that are being executed by the watch 2. For example, the watch 2 can provide information regarding time, health of a user, status notifications, notifications or messages received from externally connected devices or communicating devices and/or software executing on such devices. The watch 2 may also provide information about applications or otherwise display messages, video, operating commands, and so forth that are executing on the consumer product.

The display 12 can also be configured to receive input. The display 12 may be integrated with or incorporated with a touch panel or touch sensor that includes an array of capacitive touch electrodes. In embodiments where the display 12 is configured to receive input, the display 12 can have an input area. The input area can cover the entire display 12 or substantially all of the display 12. In another embodiment, the input area can cover only a portion of the display 12. Further, the display 12 can be a multi-touch display that is configured to receive and process various contact points received on the display.

The display 12 can include image pixels formed from light-emitting diodes (LEDs), organic LEDs (OLEDs), plasma cells, electronic ink elements, liquid crystal display (LCD) components, or other suitable image pixel structures. The display 12 can be shaped to cover or substantially cover a top portion of the housing 16.

The watch 2 can also include other input and output mechanisms. For example, the watch 2 can include or interface with one or more buttons, crowns, keys, dials, trackpads, microphones and the like. Each of these input mechanisms can be disposed on a top surface of the housing 16 and/or on one or more sidewalls of the housing 16. The watch 2 can also include one or more speakers, headphone jacks and the like.

The watch 2 can also be configured to provide haptic output, audio output, visual output or combinations thereof. With respect to the haptic output, the watch 2 can have one or more haptic actuators that are configured to provide the haptic output. The haptic output, and other forms of output provided above, can vary based on a variety of factors. Some of these include, but are not limited to, how the watch 2 is being used, which applications are being executed, the information that is output on the display 12 and the like.

The watch 2 can also include operation components (potentially housed with the housing 16). These components can include a processor, a memory, a communication system, an antenna and the like. For example, the watch 2 can include a processor coupled with or in communication with a memory. The watch 2 can also include one or more communication interfaces, the communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces.

The watch 2 can also include various sensors. These sensors can include and are not limited to, biometric sensors, gyroscopes, accelerometers, light sensors, optical sensors, global positioning sensors, and so on. These sensors can assist with or otherwise provide functionality to the watch 2. In addition, readings from these sensors can be analyzed by the watch 2 and/or can be transmitted to a companion device or other product.

As also shown, in FIG. 1, the watch 2 can include a channel 14, a groove, or other such opening that is configured to receive a portion of the watch band 50. The watch band 50 can be interchangeable with respect to the watch body 10. Thus, watch bands and watch bodies and various combinations thereof can comprise an ecosystem whereby each component of the ecosystem can be interchangeable with respect to one another. For example, one watch body can be used with various watch bands. By further example, one watch band can be used with various watch bodies.

Figure 2:
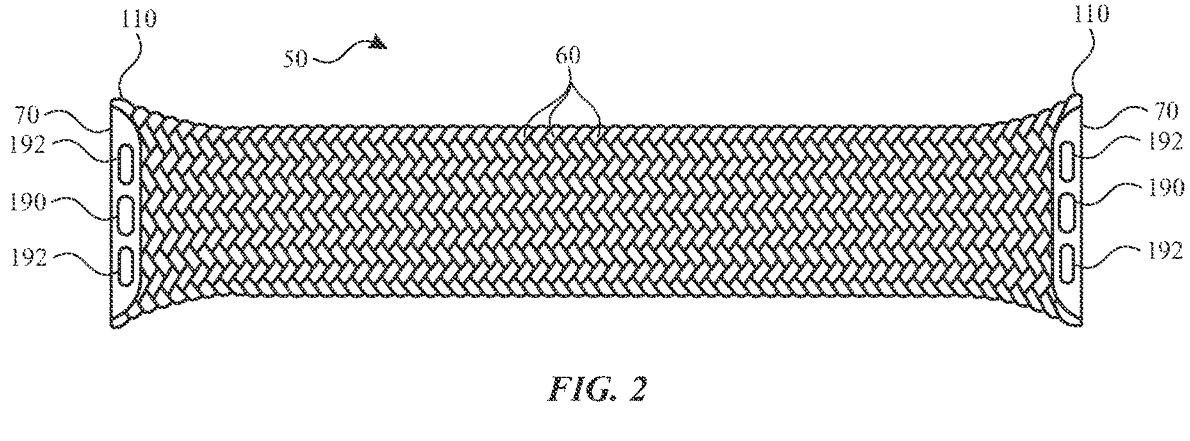
FIG. 2 illustrates a top view of a watch band.

Referring now to FIG. 2, the watch band 50 can provide a continuous structure extending between end sections 110 thereof that each connect to the housing. The watch band 50 can be stretchable to allow donning and removal of the watch band 50 over a hand of the user and secure coupling to the wrist of the user. As such, the watch band 50 does not require separate portions to join together (e.g., with a clasp). Alternatively, the watch band 50 can be assembled as separate portions that join together (e.g., with a clasp) and optionally provide adjustable size configurations. Such a configuration can be provided with the end sections features as discussed herein.

The watch band 50 can include multiple strands 60 that are braided together along a length of the watch band 50. The strands 60 can be braided together in a repeating braid pattern that can extend along a substantial length of the watch band 50. Additionally or alternatively, multiple braiding patterns can be applied at various sections of the watch band 50. Braid patterns can vary in the number of bundled strands that are grouped together. For example, the strands can be braided together by crossing individual strands or by crossing groups of multiple strands that extend alongside each other. Braid patterns can vary in the number of strands crossed by any given strand or group of strands. For example, the strands 60 can cross 1, 2, 3, 4, or more than 4 other strands with each pass (e.g., crossing over or under other strand(s)). The strands 60 can turn at edges of the watch band 50 to continue a braid pattern. The braid pattern can allow the strands to extend generally transverse (e.g., oblique or diagonal) with respect to a longitudinal axis of the watch band 50. Accordingly, the pitch angle of the strands 60 with respect to the longitudinal axis to shift during use to allow the watch band 50 to stretch (e.g., elongate) and reduce its width or contract (e.g., foreshorten) and increase its width. Additionally, elasticity of individual strands 60 can contribute to the stretch capabilities of the watch band 50. Accordingly, the watch band 50 can stretch to facilitate donning and removal and for comfort during use. The strands 60 can further move (e.g., flex) relative to each other to provide conformity with a wrist of the user. The braid pattern can further provide a breathable structure that allows passage of air for cooling and moisture wicking.

As used herein, a strand is any elongate object, including a unitary elongate object or a collection of elongate objects (e.g., threads, filaments, or fibers) that are arranged (e.g., braided, twisted, plaited, or laid parallel) to form a unit for further arrangement (e.g., braided, twisted, plaited, or laid parallel) with other strands. As used herein, a braid is an arrangement of multiple strands or other units forming a pattern of crossings, with the strands extending transverse (e.g., oblique or diagonal) with respect to a longitudinal axis of the braid. A braid can include plaited strands, interlaced strands, intertwined strands, etc.

The watch band 50 includes end sections 110 at opposing ends of the watch band 50 that fit within respective recesses or channels of the housing 16 and allow the watch band 50 to be removably attached to the housing of the watch body. Generally, the end sections 110 can lock into the channels and thereby maintain connection between the watch band 50 and the housing.

The watch band 50 may provide an attachment element 70 at each of the end sections 110. The attachment element 70 can be coupled to the strands 60 that extend and/or terminate within the end sections 110. For example, the attachment element 70 can surround and/or cover at least some of the ends of the strands 60. The attachment element 70 can provide rigid structural support to the end sections 110 for insertion into the channels. For example, the attachment elements 70 be formed from a metal or other rigid material. The attachment elements 70 can maintain a defined shape corresponding to a shape of the channel into which each is inserted. The attachment element 70 may cover only a portion of the strands at the corresponding end section, as discussed further herein.

The watch band 50 may have a locking mechanism 190 at the attachment element 170. The locking mechanism 190 can protrude beyond an outer surface of the attachment element 70 to engage a portion of the watch body, such as within or adjacent to the channel of the housing. The user can release a locking mechanism 190 to permit the end sections 110 to slide or otherwise move out of the channels. It will be recognized that a variety of locking mechanisms can be employed, such as locks, snaps, clasps, threads, and pins included on the watch band 50 and/or the watch body for securely attaching the watch band 50 to the watch body.

The watch band 50 may have one or more friction pads 192 that are integrated with the attachment element 70. The friction pads may be positioned at various locations on the attachment element 70 of the watch band 50 and be used to increase friction, restrict movement, and maintain spacing of the end sections 110 within the channels. The friction pads 192, or at least a portion of each friction pad 192, extends or protrudes from one or more surfaces of the attachment element 70. The portion of the friction pad 192 that extends beyond the outer surface of the attachment element 70 is used to: (1) increase friction between the end section 110 and the channel of the housing of the electronic device into which the end section 110 is to be placed; and (2) maintain or substantially maintain spacing between one or more surfaces of the end section 110 and a surface of a channel of the housing of the electronic device into which the end section 110 is to be placed. Because the friction pads 192 help maintain spacing between the end section 110 and the channel, undesired movement, rattling and/or noise caused by any movement of the end section 110 may be reduced when the end section 110 is contained within the channel. Additionally or alternatively, the end sections 110 of the watch band 50 may have a thickness that is slightly greater than a dimension of a channel. As such, the end sections 110 may have to be compressed to enter the channel but expands within the channel to secure the end section 110 within the channel.

Figure 3:
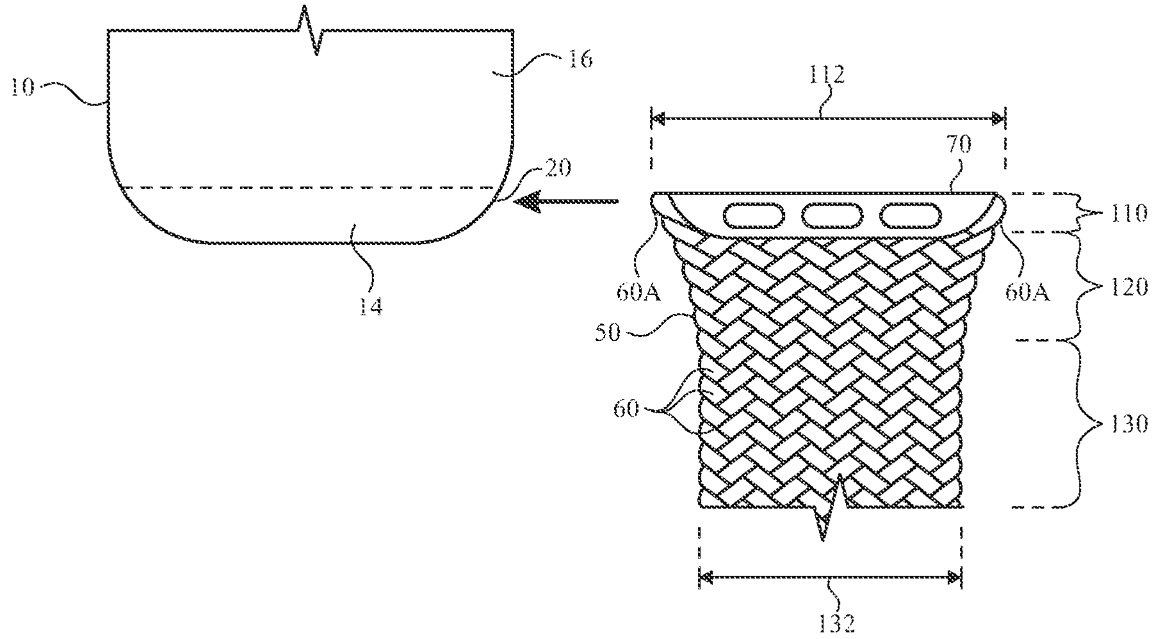
FIG. 3 illustrates a top view of a watch band and housing in a separated configuration.
Figure 4:
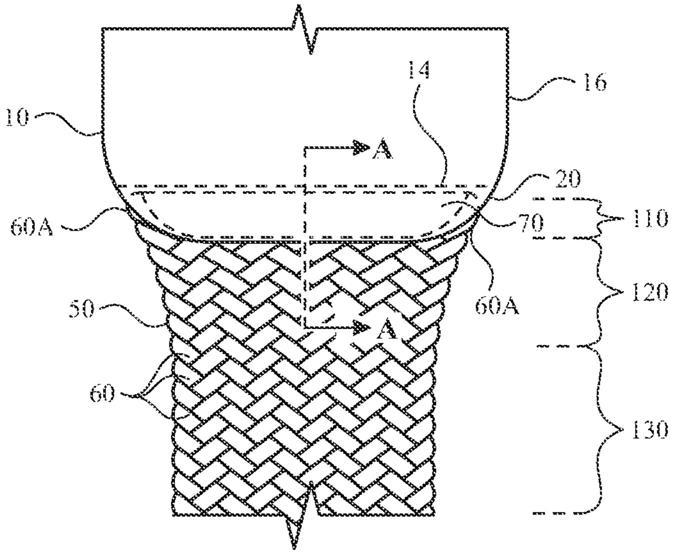
FIG. 4 illustrates a top view of the watch band and housing of FIG. 3 in a connected configuration.

Referring now to FIGS. 3 and 4, the watch band can be inserted into the channel of the watch body. As shown in FIG. 3, the end section 110, including the attachment element 70, can be slid laterally into the channel 14 formed within the housing 16 of the watch body 10. The attachment element 70 can provide structural rigidity during insertion.

As further shown in FIG. 3, the watch band 50 (e.g., the strands 60) can form the end section 110 for residing within the channel 14. The end section 110 can have a first width 112. The first width 112 can be a maximum width of the end section 110 or any width of the end section 110 that is within the channel 14 when the end section 110 is in the channel 14. The first width 112 can be defined by one or more outer strands 60A positioned at opposing sides of the attachment element 70. The outer strands 60A can define at least a portion of the outermost periphery of the end section 110, as discussed further herein.

The watch band 50 (e.g., the strands 60) can also form a taper section 120 for residing outside the channel 14. The taper section 120 can extend away from the end section 110.

The watch band 50 (e.g., the strands 60) can also form an extension section 130 extending away from the taper section 120. The extension section 130 can have a second width 132 that is substantially uniform along a length of the extension section 130. It will be understood that the width will vary based on the location and diameter of strands 60 that turn about the edges of the extension section 130. As used herein, a width is substantially uniform along the length of the extension section 130 if the width varies by less than a diameter of the strands strand that form the extension section 130. Accordingly, the braid pattern can provide evenly distributed spacing of strands at consistent pitch angles to maintain a substantially uniform second width 132, even if the second width 132 varies slightly based on the diameter of the strands 60.

In contrast to the substantially uniform second width 132 of the extension section 130, the taper section 120 tapers from the first width 112 to the second width 132 along a length of the taper section 120. The taper can have a shape, for example, linear, curved, logarithmic, elliptical, exponential, parabolic, and combinations thereof.

As shown in FIG. 4, the end section 110 can be inserted and secured within the channel 14. The end section 110 may have a profile shape that corresponds to at least a portion of the profile shape of the housing 16, for example at the outer periphery 20. In particular, as shown in FIG. 4, the width of the channel 14 may be substantially equivalent to the width of the end section 110 of the watch band 50. When the end section 110 is fully inserted, as shown in FIG. 4, at least a portion of the outer surface of the end section 110 is flush or substantially flush with the outer periphery 20 defined by the housing 16. The outer strands 60A can be within the channel 14 at opposing lateral ends thereof and on opposing sides of the attachment element 70. The outer strands 60A can be fully within, aligned with, or proud of the outer periphery 20 defined by the housing 16.

When the end section 110 is inserted within the channel 14, the attachment element 70 can be fully enclosed within the channel 14. For example, no portion of the attachment element 70 can extend outside the channel 14.

The attachment element 70 can be arranged so that no portion of the attachment element 70 can be visible from outside the channel 14. The taper section 120 can cover (e.g., optically block) at least a portion of the channel 14. Additionally, the outer strands 60A can cover (e.g., optically block) at least a portion of the channel 14. On other sides of the attachment element 70, an inner surface of the housing 16 can abut the attachment element 70 and the housing 16 can cover (e.g., optically block) at least a portion of the channel 14. Accordingly, no portion of the attachment element 70, while within the channel 14, can be visible from outside the channel 14. The result includes that only the strands are visible, thereby providing an appearance that is based on only the strands, rather than any other supporting structure.

The taper section 120 can be located outside the channel when the end section 110 is in the channel 14. Accordingly, the taper section 120 can be outside the channel and visible to a user. The taper section 120 can taper from both the first width 112 of the end section 110 and the outer periphery 20 of the housing 16. Accordingly, the contours of the outer periphery 20 of the housing 16 can transition smoothly to the tapering width of the taper section 120, which in turn transitions to the substantially uniform second width 132 of the extension section 130. Accordingly, the taper section 120 can provide smooth contours that give the appearance of continuity across the housing 16 and the watch band 50. The result includes the appearance of a well-integrated housing and watch band, which can be visually appealing.

The taper section 120 can extend along a significant length of the watch band 50 to provide a gradual transition. For example, the taper section 120 can extend between 2 mm and 20 mm along the longitudinal length, for example about 5 mm along the length. By further example, the taper section 120 can extend along a length that spans at least two strand crossings. Accordingly, the taper is distributed across multiple strand crossings. In contrast, stretching the ends of only the outermost strands would not provide such a distributed taper, but would instead widen a section spanning about one strand crossing. The distribution of the taper described herein can be achieved by spreading multiple strands, as discussed further herein.

Figure 5:
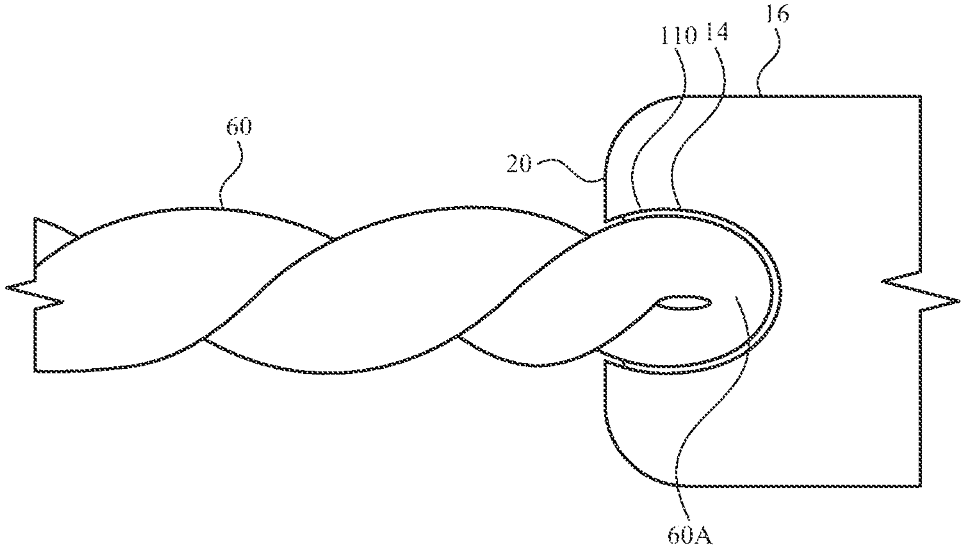
FIG. 5 illustrates a side view of a watch band and housing.
Figure 6:
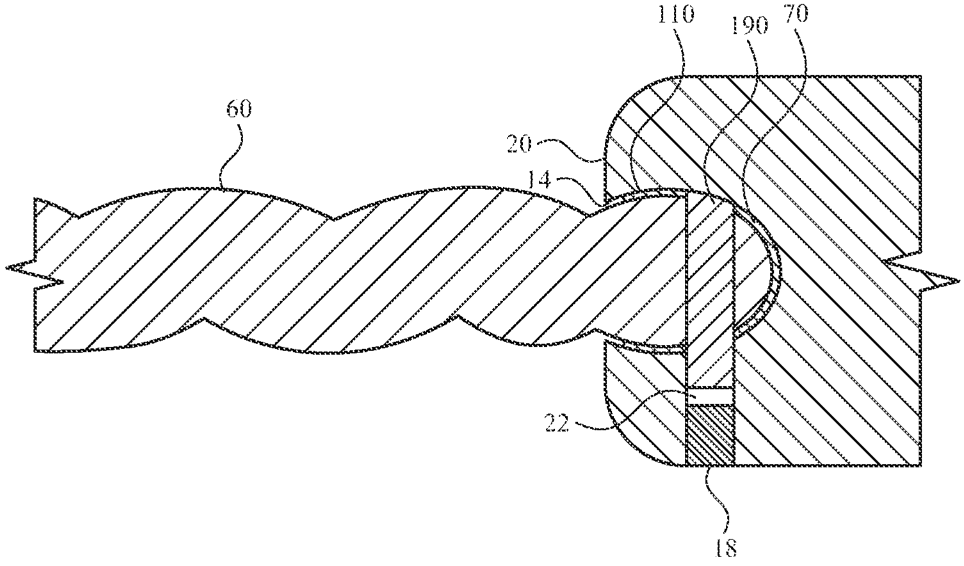
FIG. 6 illustrates a sectional view of a watch band and housing taken at line A-A of FIG. 4.

Referring now to FIGS. 5 and 6, the watch band can be inserted into the channel of the watch body. As shown in FIG. 5, the outer strand 60A can cover (e.g., optically block) at least a portion of the channel 14. The outer strand 60A can form a loop at (e.g., within) the channel 14, so that a terminal end of the outer strand 60A is formed by a continuous portion of the outer strand 60A. The shape of the loop can be similar to a shape of the channel 14, so that the loop fits within the channel and substantially fills an end of the channel 14.

As shown in FIG. 6, the channel 14 may have an undercut that retains the end section 110 within the channel 14. The channel 14 of the housing 16 has an opening height at the opening of the channel 14 and a maximum width within the channel 14. The maximum width may be greater than the opening width to form the undercut. Thus, due to the undercut formed by the channel 14, the opening width of the channel may be configured to limit the movement of the end section 110 in a direction that is perpendicular to the lateral insertion and removal directions.

As further shown in FIG. 6, the attachment element 70 can be arranged so that no portion of the attachment element 70 can be visible from outside the channel 14. The strands 60, the outer strands 60A, and the housing can cover (e.g., optically block) at least a portion of the channel 14. Accordingly, no portion of the attachment element 70, while within the channel 14, can be visible from outside the channel 14.

As further shown in FIG. 6, the end section 110 includes a locking mechanism 190. The locking mechanism 190 can extend through one or more openings of the attachment element 70. The locking mechanism 190 can engage a portion of the housing 16, such as a recess 22 extending from the channel 14. The locking mechanism being configured to securely engage the housing 16 until actuated by a release button 18 within the housing 16. The locking mechanism can be biased to engage the housing 16 when the end section 110 is inserted in the channel 14. The release button 18 can be biased away from the locking mechanism 190 and accessible to a user for actuation.

Figure 7:
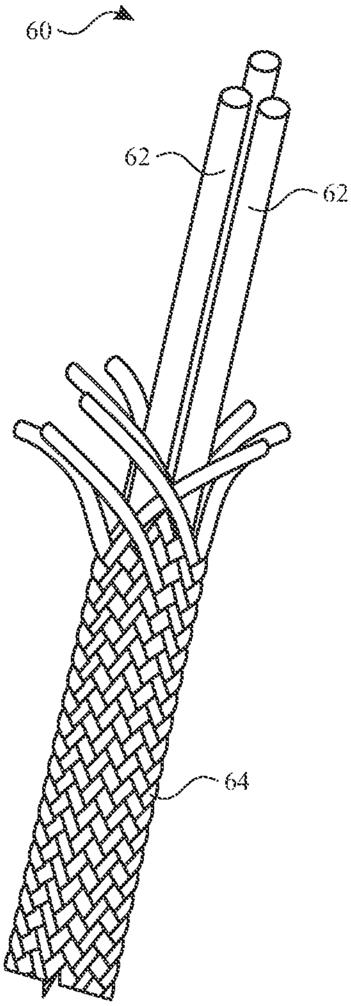
FIG. 7 illustrates a perspective view of a strand having core filaments and outer threads.

Referring now to FIG. 7, each strand 60 can be formed by one of a variety of arrangements. For example, as shown in FIG. 7, each strand 60 can include one or more filaments 62. Where multiple filaments 62 are used, the filaments 62 can extend in parallel to each other or be braided or otherwise bound together. The filaments 62 can be stretched or elongated along longitudinal lengths thereof. The filaments 62 can include an elastic material, an elastomer, rubber, nitrile, hydrogenated nitrile, ethylene-propylene, fluorocarbon, chloroprene, silicone, fluorosilicone, polyacrylate, ethylene acrylic, styrene-butadiene, polyurethane, natural rubber, or combinations thereof.

In some examples, the one or more filaments 62 can be surrounded by braided threads 64. The braided threads 64 can form a cylindrical sheath that surrounds the one or more filaments 62 and binds them together. Accordingly, the braided threads 64 can define an interior portion within which the filaments 62 reside. The braided threads 64 can stretch along their respective lengths and shift relative to each other. The threads 64 can provide an outer surface of the strand 60. Various aspects of the threads 64 (e.g., color, thickness, quantity, pattern) can be selected accordingly. The threads 64 can include an elastic material, an elastomer, rubber, nitrile, hydrogenated nitrile, ethylene-propylene, fluorocarbon, chloroprene, silicone, fluorosilicone, polyacrylate, ethylene acrylic, styrene-butadiene, polyurethane, natural rubber, or combinations thereof. The material of the threads 64 can be the same as or different than the material of the filaments 62.

Figure 8:
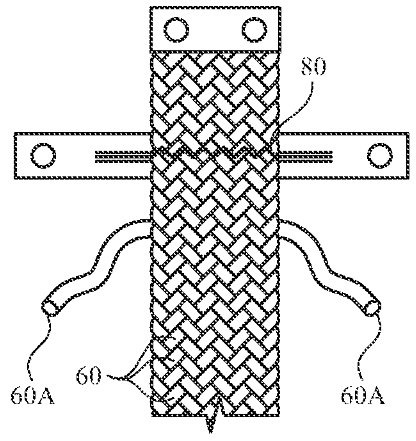
FIG. 8 illustrates a top view of a watch band.

Referring now to FIGS. 8-11, the strands 60 of the watch band can be spread to form a widened end section and a taper section. As shown in FIG. 8, the strands 60 can be arranged in a braid pattern. The braid pattern can be uniform along at least a portion of the length of the watch band. One or more (e.g., a pair) of the strands can be isolated to form outer strands 60A on opposing sides. The outer strand 60A can be maintained separate from the other strand 60. A stitch 80 can be provided across a width of the watch band, such that the stitch 80 crosses and engages multiple strands 60. The stitch 80 can be formed of one or more threads in a stitch pattern. The stitch 80 can be stretchable based on an elasticity of the material and/or an arrangement thereof. The stitch 80 can engage one or more (e.g. all) of the strands 60 across a width of the watch band.

Figure 9:
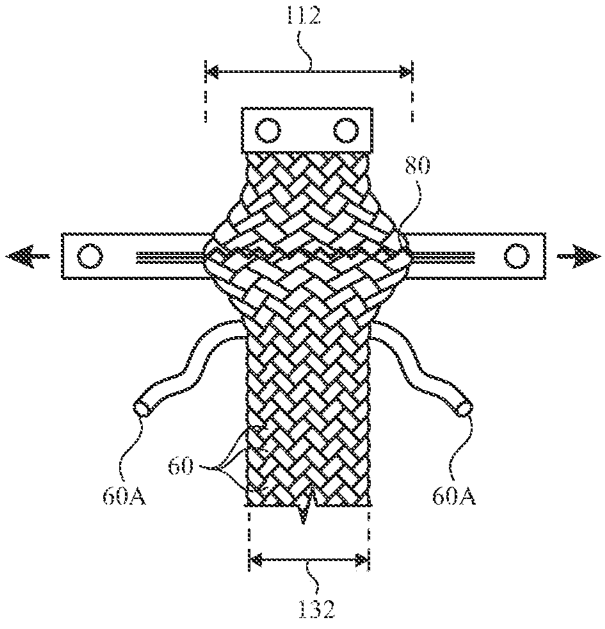
FIG. 9 illustrates a top view of a watch band in a stretched configuration.

As shown in FIG. 9, the stitch 80 can be stretched by pulling on ends thereof. Because the stitch 80 engages one or more strands 60 of the watch band across a width thereof, stretching the stitch 80 causes the strands 60 to spread apart and away from each other to increase the overall width in the local region (e.g., from the second width 132 to the first width 112). The spreading of the strands 60 can be substantially uniform, such that the density of the strands is decreased evenly across the entirety of the stitched area. Likewise, the spreading of the strands 60 can cause every strand to move based on how far it is from a central location within the watch band. As such, the spreading of the strands 60 at the stitch 80 causes a corresponding spreading in regions farther away from the stitch 80. This spreading provides the shape and form of the taper section.

Figure 10:
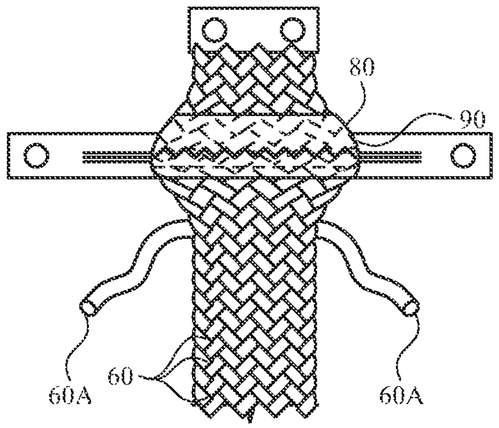
FIG. 10 illustrates a top view of a watch band in a stretched configuration with a binder.

As shown in FIG. 10, a binder 90 can be provided to the strands 60 in the vicinity of the stitch 80. For example, while the stitch 80 is stretched and the strand 60 are spread apart from each other, the binder 90 can be applied to one or more sides of the watch band and in direct contact with the strands 60. The binder 90 can include a thermoplastic material, such as a polycarbonate, that can be melted or partially melted to bind to and infiltrate the strands 60. The binder 90 can subsequently be cooled and maintain a more rigid shape that holds the strands 60 in place.

Figure 11:
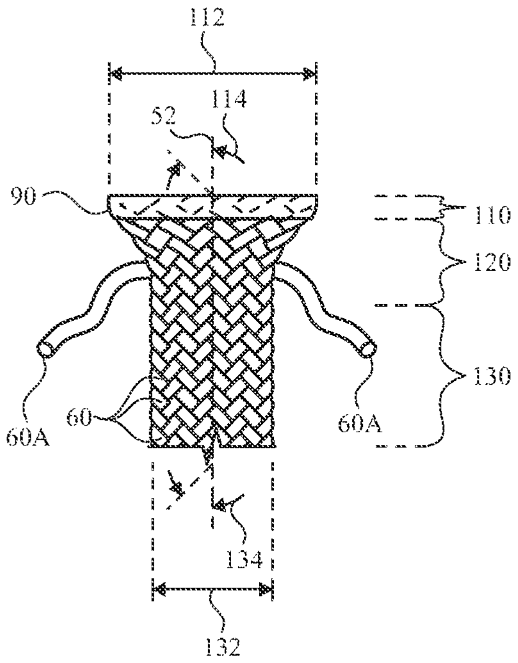
FIG. 11 illustrates a top view of a watch band after removing a portion thereof.

As shown in FIG. 11, a portion of the strands 60 can be severed at a location that separates the strand 60 and a portion of the binder 90 from the stitch 80. For example, a sacrificial portion of the workpiece can be designated for removal. The sacrificial portion can include the stitch 80, such that the stitch 80 and any attached structures do not form a portion of the final product. A new terminal and of the watch band can be defined by the binder 90 and terminal ends of the strands 60. This terminal and can be designated as the end section 110. The end section 110 can have the first width 112 or another width that, when paired with the outer strands 60A, forms the first width 112. The taper section 120 can taper from the end section 110 to the extension section 130, having the second width 132. In the end section 110, the strands 60 are maintained in a braid pattern that has a first pitch angle 114 that is different from a second pitch angle 134 formed in the extension section 130. As used herein, a pitch angle is an angle formed between a strand extension direction and a longitudinal axis 52 of the watch band. As shown in FIG. 11, the first pitch angle 114 in the end section 110 can be greater than the second pitch angle 134 in the extension section 130. The pitch angles within the taper section 120 correspondingly transition from the first pitch angle 114 to the second pitch angle 134.

Figure 12:
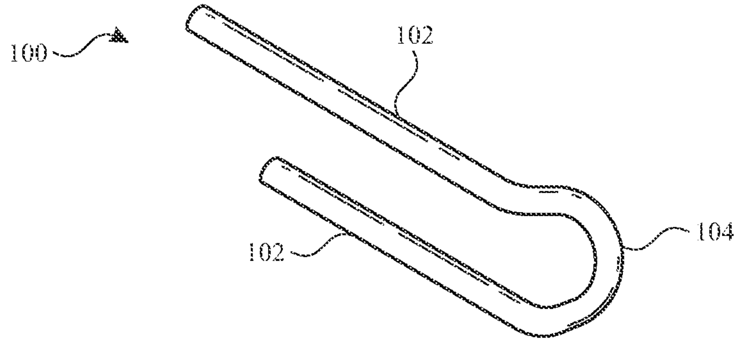
FIG. 12 illustrates a perspective view of an anchor element.
Figure 13:
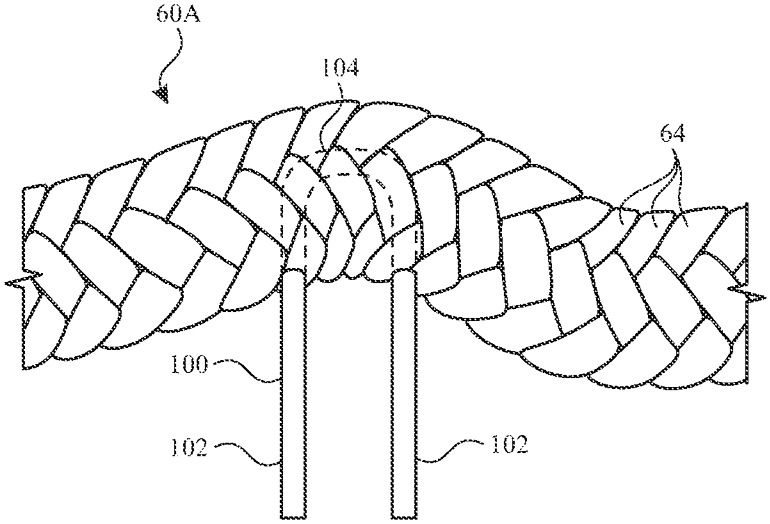
FIG. 13 illustrates a view of an anchor element extending from within a strand.

Referring now to FIGS. 12 and 13, an anchor element 100 is provided to couple an outer strand to an attachment element to form an end section of the watch band. As shown in FIG. 12, the anchor element can include an inner portion 104 for residing within an outer strand and one or more outer portions 102 extending away from the inner portion 104. The inner portion 104 can form a shape that corresponds to a desired shape of the outer strand. For example, the inner portion 104 can define a pathway that is along the loop to be formed by the outer strand 60A. In such an example, the inner portion 104 can be curved to form at least a portion of the loop. By further example, the inner portion 104 can form a shape that is similar to or congruent to a profile of the channel into which the outer strand 60A is inserted. While a pair of outer portions 102 are shown, it will be understood that any number of outer portions 102 can be provided. The outer portions 102 can optionally extend straight and/or in substantially similar (e.g., parallel) directions.

As shown in FIG. 13, the inner portion 104 of the anchor element 100 can be positioned within the outer strand 60A, and the outer portions 102 of the anchor element 100 can extend away from the outer strand 60A. For example, the inner portion 104 can extend within the braided threads 64 of the outer strand 60A. As such, the braided threads 64 can wrap around the inner portion 104, along with the filaments (not shown). Because the anchor element 100 can be more rigid than the outer strand 60A, the outer strand 60A can maintain a fixed shape that is based on the shape of the inner portion 104. Furthermore, a position and/or orientation of the outer strand 60A can be maintained when the outer portions 102 of the anchor element 100 are coupled to another structure (e.g., the attachment element), as discussed further herein.

Figure 14:
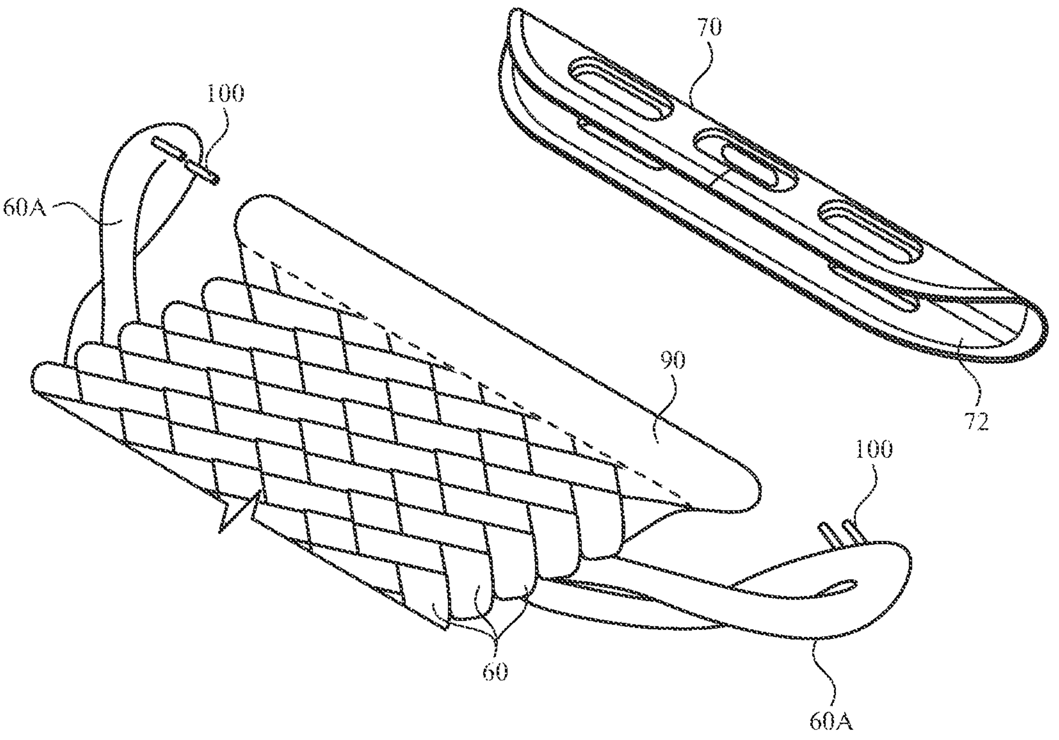
FIG. 14 illustrates a perspective and exploded view of a watch band.
Figure 15:
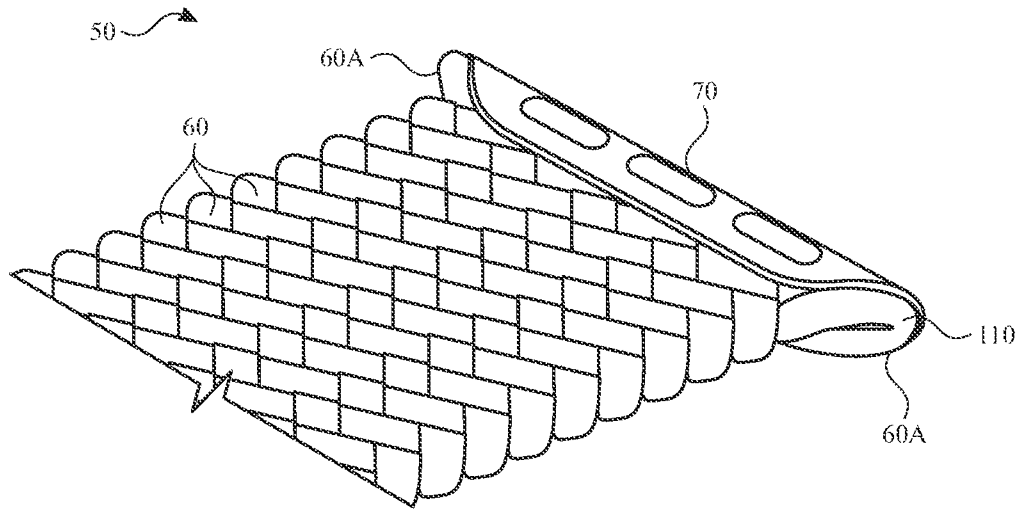
FIG. 15 illustrates a perspective view of the watch band of FIG. 14 in an assembled configuration.

Referring now to FIGS. 14 and 15, the strands can be coupled to an attachment element to form an end section of the watch band. For example, as shown in FIG. 14, the strands 60 can terminate at a region that is optionally bonded by the binder 90. The outer strands 60A, each having an anchor element 100, can be positioned at the same end near the binder 90. The attachment element 70 can provide an interior portion 72 for receiving the strands 60.

As shown in FIG. 15, the attachment element 70 can be provided over the strands 60 and the binder 90. In one example, the attachment element 70 can entirely cover the binder 90. Additionally, the outer strands 60A can be coupled to the attachment element 70 by securing the anchor elements 100 to opposing sides of the attachment element 70. The strands 60, the anchor elements 100, and/or the binder 90 can be secured within the interior portion 72 of the attachment element 70 by one or more of a variety of mechanisms. For example, an adhesive can be provided to bind two or more of these components together. Other mechanisms, such as welding and/or other mechanical attachment, are contemplated. Such mechanisms can be fixed or detachable. Such mechanisms can be contained entirely within the interior portion 72 of the attachment element 70 to be hidden from view.

Figure 16:
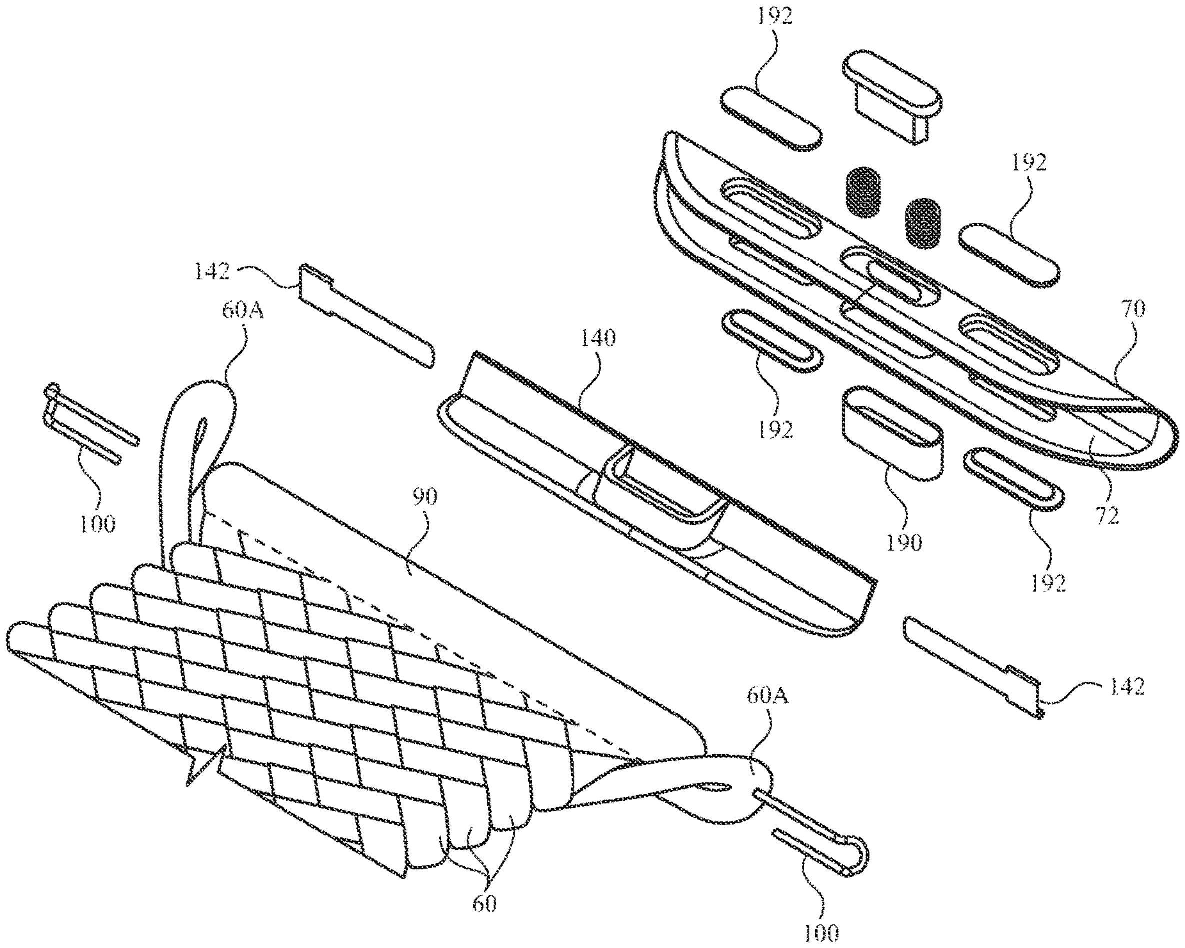
FIG. 16 illustrates a perspective and exploded view of a watch band.

Referring now to FIG. 16, an alternate design is shown with additional details. It will be understood that the embodiment illustrated in FIG. 16 is a more detailed example of the embodiments illustrated previously, thereby providing additional and/or alternative features that can optionally be provided to implement the aspects described above. As shown in FIG. 16, the strands 60 can terminate at a region that is optionally bonded by the binder 90. The outer strands 60A can be positioned at the same end near the binder 90. The anchor elements 100 can be provided to couple the outer strands 60A to the attachment element 70 via another structure, such as intermediate element 140. For example, each of the anchor elements 100 can extend through an outer strand 60A and be held in place against the intermediate element 140 by an engagement element 142 that is welded or otherwise coupled to the intermediate element 140. The attachment element 70 can provide the interior portion 72 for receiving the intermediate element 140. The intermediate element 140 can be secured within the interior portion 72 of the attachment element 70 by one or more of a variety of mechanisms. For example, an adhesive can be provided to couple two or more of these components together. Other mechanisms, such as welding and/or other mechanical attachment, are contemplated. Such mechanisms can be fixed or detachable. Such mechanisms can be contained entirely within the interior portion 72 of the attachment element 70 to be hidden from view.

A locking mechanism 190 can be provided as extending through openings in the attachment element 70 and the intermediate element 140. As shown, the locking mechanism 190 can be an assembly of parts that move relative to each other and extend through opposing sides of the attachment element 70 and the intermediate element 140. The locking mechanism 190 can engage and/or interact with different portions of a channel when inserted therein. One or more friction pads 192 can also be included on the attachment element 70, as discussed herein.

Figure 17:
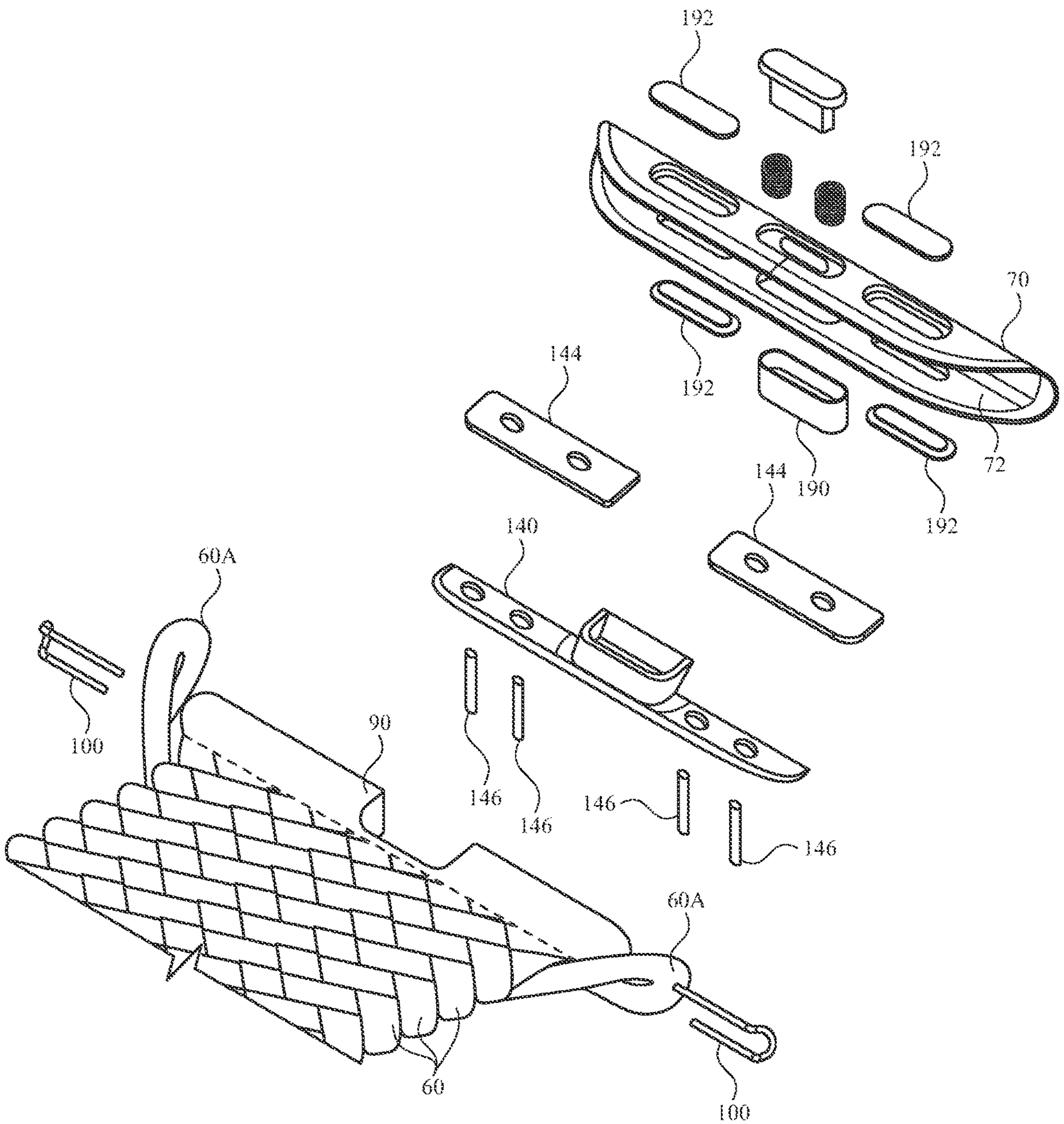
FIG. 17 illustrates a perspective and exploded view of a watch band.
Figure 18:
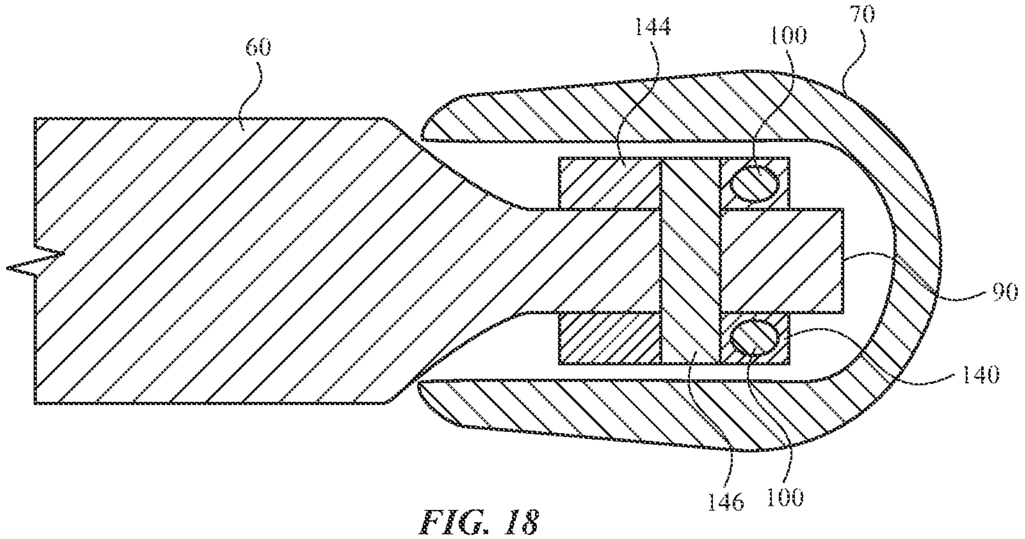
FIG. 18 illustrates a sectional view of the watch band of FIG. 17.

Referring now to FIGS. 17 and 18, another design is shown with additional details. It will be understood that the embodiment illustrated in FIG. 17 can be considered a more detailed example of the embodiments illustrated previously, thereby providing additional and/or alternative features that can optionally be provided to implement the aspects described above. As shown in FIG. 17, the strands 60 can terminate at a region that is optionally bonded by the binder 90. The outer strands 60A can be positioned at the same end near the binder 90. The anchor elements 100 can be provided to couple the outer strands 60A to the attachment element 70 in concert with another structure, such as intermediate element 140. For example, each of the anchor elements 100 can extend through an outer strand 60A and be held in place by the plate elements 144 and/or the intermediate element 140. The anchor elements 100 can be welded or otherwise coupled to a corresponding one of the plate elements 144 and the intermediate element 140.

The strands 60 and/or the binder 90 can be coupled to the attachment element 70 via the plate elements 144, the intermediate element 140, and the pins 146. For example, a portion of the strands 60 and/or the binder 90 can be placed between the plate elements 144 and the intermediate element 140. The pins 146 can extend through the intermediate element 140, the binder 90, and a corresponding one of the plate elements 144. The pins 146 can be securely coupled (e.g., fused, welded, adhered, etc.) to each of the intermediate element 140 and a corresponding one of the plate elements 144.

A locking mechanism 190 can be provided as extending through openings in the attachment element 70 and the intermediate element 140. As shown, the locking mechanism 190 can be an assembly of parts that move relative to each other and extend through opposing sides of the attachment element 70 and the intermediate element 140. The locking mechanism 190 can engage and/or interact with different portions of a channel when inserted therein. One or more friction pads 192 can also be included on the attachment element 70, as discussed herein.

As shown in FIG. 18, the attachment element 70 can provide the interior portion 72 for receiving the intermediate element 140, the plate elements 144, and the pins 146. The intermediate element 140 can be secured within the interior portion 72 of the attachment element 70 by one or more of a variety of mechanisms. For example, an adhesive can be provided to couple two or more of these components together. Other mechanisms, such as welding and/or other mechanical attachment, are contemplated. Such mechanisms can be fixed or detachable. Such mechanisms can be contained entirely within the interior portion 72 of the attachment element 70 to be hidden from view.

Figure 19:
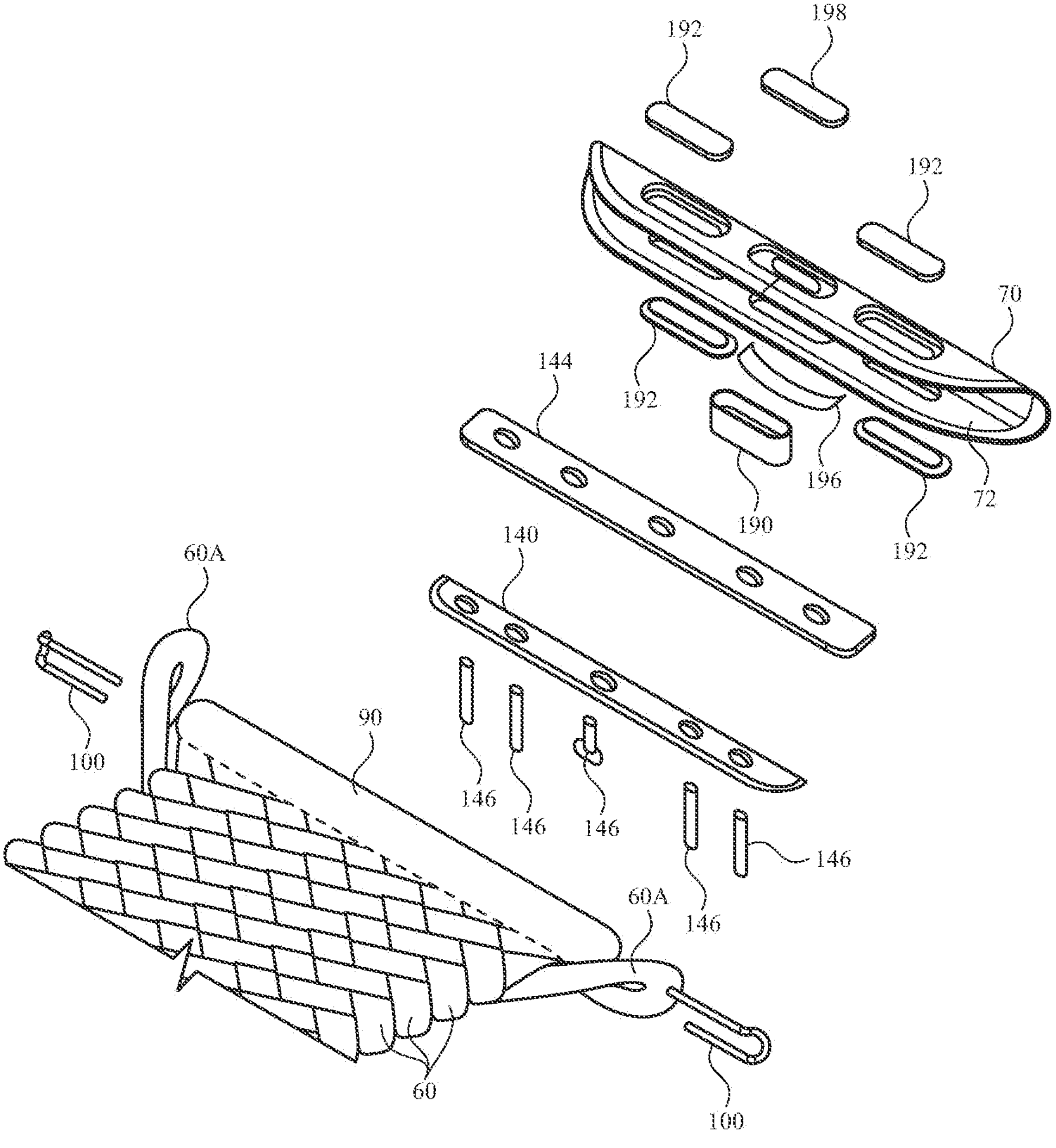
FIG. 19 illustrates a perspective and exploded view of a watch band.
Figure 20:
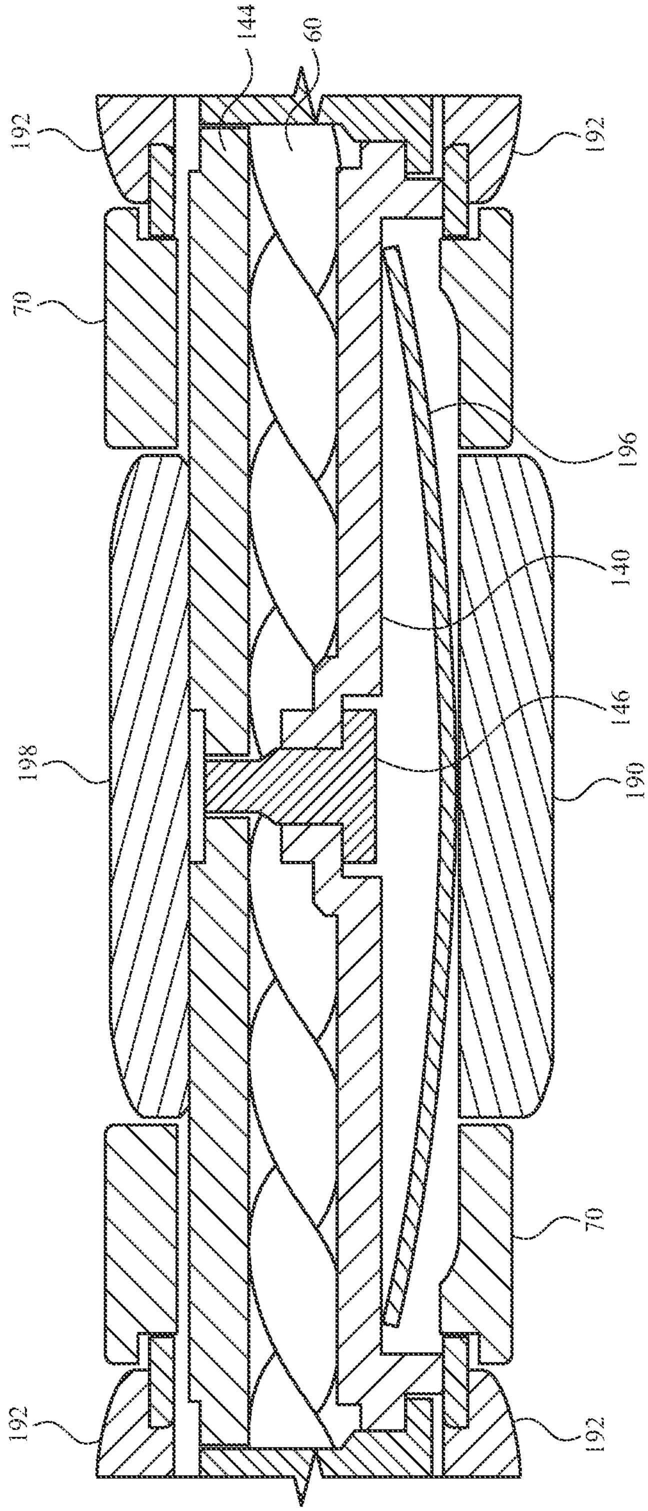
FIG. 20 illustrates a sectional view of the watch band of FIG. 19.

Referring now to FIGS. 19 and 20, another design is shown with additional details. It will be understood that the embodiment illustrated in FIG. 19 can be considered a more detailed example of the embodiments illustrated previously, thereby providing additional and/or alternative features that can optionally be provided to implement the aspects described above. As shown in FIG. 19, the strands 60 can terminate at a region that is optionally bonded by the binder 90. The outer strands 60A can be positioned at the same end near the binder 90. The anchor elements 100 can be provided to couple the outer strands 60A to the attachment element 70 in concert with another structure, such as intermediate element 140 and/or plate element 144. For example, each of the anchor elements 100 can extend through an outer strand 60A and be held in place by the plate element 144 and/or the intermediate element 140. The anchor elements 100 can be welded or otherwise coupled to the plate element 144 and/or the intermediate element 140.

The strands 60 and/or the binder 90 can be coupled to the attachment element 70 via the plate element 144, the intermediate element 140, and the pins 146. For example, a portion of the strands 60 and/or the binder 90 can be placed between the plate element 144 and the intermediate element 140. The pins 146 can extend through the intermediate element 140, the binder 90, and the plate element 144. The pins 146 can be securely coupled (e.g., fused, welded, adhered, etc.) to each of the intermediate element 140 and the plate element 144. The pins 146 can have a small cross-sectional diameter so that they can extend through the strands 60 and/or the binder 90 without substantially displacing or deflecting the strands 60 from a natural position based on the braid pattern thereof. Accordingly, the strands 60 and/or the binder 90 can surround each of the pins 146.

A locking mechanism 190 can be provided on one side of the attachment element 70, and a cap element 198 can be provided on an opposite side of the attachment element 70. The locking mechanism 190 can be part of or include an assembly of parts that move relative to each other. For example, a spring element 196 can bias the locking mechanism 190, as discussed further herein. One or more friction pads 192 can also be included on the attachment element 70, as discussed herein.

As shown in FIG. 20, the attachment element 70 can receive the plate element 144, the intermediate element 140, the strands 60, and/or the binder 90. The intermediate element 140 can be secured within an interior portion of the attachment element 70 by one or more of a variety of mechanisms, as discussed above with respect to FIG. 18.

The spring element 196 can be provided in a preloaded state to bias the locking mechanism 190 to protrude from the attachment element 70 while in a nominal state. While the spring element 196 is illustrated as a leaf spring, it will be understood that other configurations for a spring can additionally or alternatively be provided. The spring element 196 can be elastically deformed to allow the locking mechanism 190 to move toward and/or at least partially into the attachment element 70. Such action can occur when the attachment element 70 is moved (e.g., slid laterally) within a channel of a housing of a watch body. The locking mechanism 190 can include an edge that forms a chamfer, bevel, slope, and/or ramp such that, when the locking mechanism 190 encounters an edge of the channel, the locking mechanism 190 is urged by the housing of the watch body to retract and move toward the attachment element 170. Within the channel, the locking mechanism 190 can by urged by the spring element 196 to engage and/or interact with different portions of the channel (e.g., a recess) when inserted therein. Once engaged, the locking mechanism 190 can restrict further movement within the channel. The locking mechanism 190 can be released from the channel by a button or other actuator of the watch body that is operable by a user.

As shown, the locking mechanism 190 and the spring element 196 can be positioned on a side of the strands 60 and/or the binder 90, such that the locking mechanism 190 and the spring element 196 can be operated and move without interfering with the position and/or alignment of the strands 60. As such, the strands 60 and/or the binder 90 can maintain a consistent and constant position and/or alignment so that the individual strands 60 are evenly distributed in a manner that provides a natural aesthetic appearance.

Figure 21:
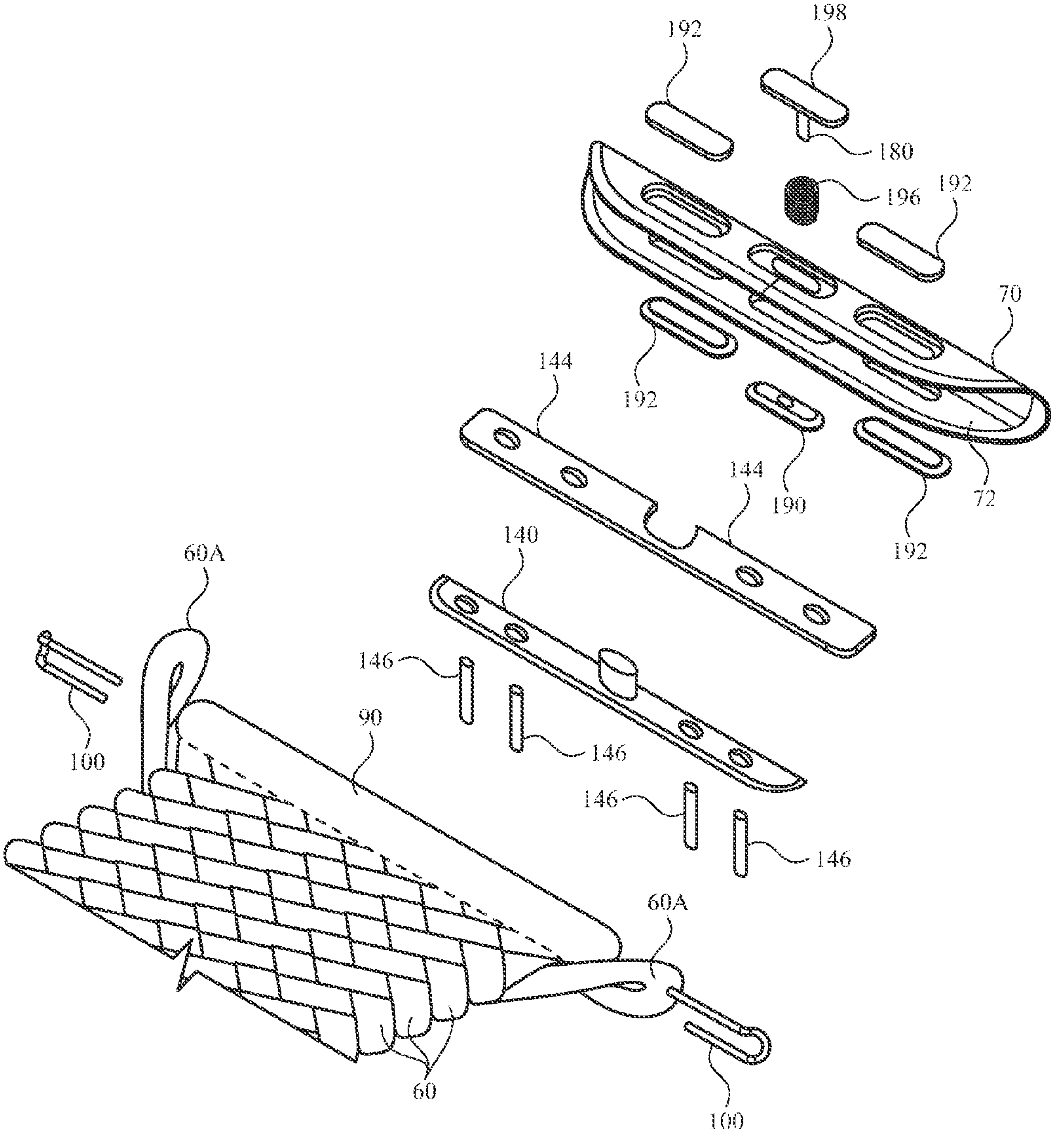
FIG. 21 illustrates a perspective and exploded view of a watch band.
Figure 22:
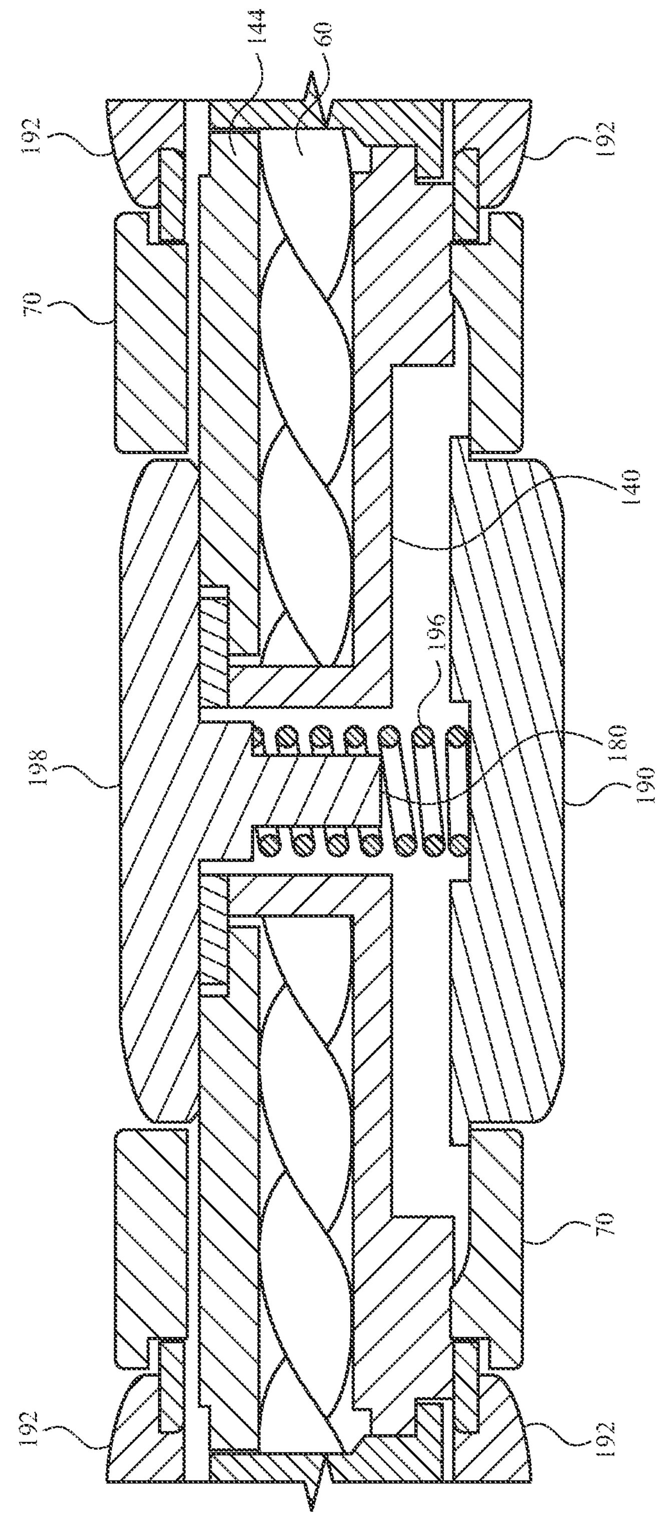
FIG. 22 illustrates a sectional view of the watch band of FIG. 21.

Referring now to FIGS. 21 and 22, another design is shown with additional details. It will be understood that the embodiment illustrated in FIG. 21 can be considered a more detailed example of the embodiments illustrated previously, thereby providing additional and/or alternative features that can optionally be provided to implement the aspects described above. As shown in FIG. 21, the strands 60 can terminate at a region that is optionally bonded by the binder 90. The outer strands 60A can be positioned at the same end near the binder 90. The anchor elements 100 can be provided to couple the outer strands 60A to the attachment element 70 in concert with another structure, such as intermediate element 140 and/or plate element 144. For example, each of the anchor elements 100 can extend through an outer strand 60A and be held in place by the plate element 144 and/or the intermediate element 140. The anchor elements 100 can be welded or otherwise coupled to the plate element 144 and/or the intermediate element 140.

The strands 60 and/or the binder 90 can be coupled to the attachment element 70 via the plate element 144, the intermediate element 140, and the pins 146. For example, a portion of the strands 60 and/or the binder 90 can be placed between the plate element 144 and the intermediate element 140. The pins 146 can extend through the intermediate element 140, the binder 90, and the plate element 144. The pins 146 can be securely coupled (e.g., fused, welded, adhered, etc.) to each of the intermediate element 140 and the plate element 144.

A locking mechanism 190 can be provided on one side of the attachment element 70, and a cap element 198 can be provided on an opposite side of the attachment element 70. The locking mechanism 190 can be part of or include an assembly of parts that move relative to each other. For example, the cap element 198 can be coupled to and/or integral with a post 180 that extends through openings in each of the intermediate element 140 and the plate element 144. The pins 146 and/or the post 180 can have a small cross-sectional diameter so that they can extend through the strands 60 and/or the binder 90 without substantially displacing or deflecting the strands 60 from a natural position based on the braid pattern thereof. Accordingly, the strands 60 and/or the binder 90 can surround each of the pins 146 and/or the post 180. One or more friction pads 192 can also be included on the attachment element 70, as discussed herein.

As shown in FIG. 22, the attachment element 70 can receive the plate element 144, the intermediate element 140, the strands 60, and/or the binder 90. The intermediate element 140 can be secured within an interior portion of the attachment element 70 by one or more of a variety of mechanisms, as discussed above with respect to FIG. 18.

A spring element 196 can be provided to bias the locking mechanism 190 to protrude from the attachment element 70 while in a nominal state. While the spring element 196 is illustrated as a helical spring wound about the post 180, it will be understood that other configurations for a spring can additionally or alternatively be provided. The spring element 196 can be elastically deformed to allow the locking mechanism 190 to move toward and/or at least partially into the attachment element 70. Such action can occur when the attachment element 70 is moved (e.g., slid laterally) within a channel of a housing of a watch body. The locking mechanism 190 can include an edge that forms a chamfer, bevel, slope, and/or ramp such that, when the locking mechanism 190 encounters an edge of the channel, the locking mechanism 190 is urged by the housing of the watch body to retract and move toward the attachment element 170. Within the channel, the locking mechanism 190 can by urged by the spring element 196 to engage and/or interact with different portions of the channel (e.g., a recess) when inserted therein. Once engaged, the locking mechanism 190 can restrict further movement within the channel. The locking mechanism 190 can be released from the channel by a button or other actuator of the watch body that is operable by a user.

As shown, the locking mechanism 190 and the cap element 198 are positioned on opposite sides of the strands 60 and/or the binder 90. The post 180 and the spring element 196 can extend through a tunnel portion formed by the plate element 144 and/or the intermediate element 140. The tunnel portion can separate the post 180 and the spring element 196 from the strands 60 and/or the binder 90, such that the locking mechanism 190 and the spring element 196 can be operated and move without interfering with the position and/or alignment of the strands 60. As such, the strands 60 and/or the binder 90 can maintain a consistent and constant position and/or alignment so that the individual strands 60 are evenly distributed in a manner that provides a natural aesthetic appearance.

Figure 23:
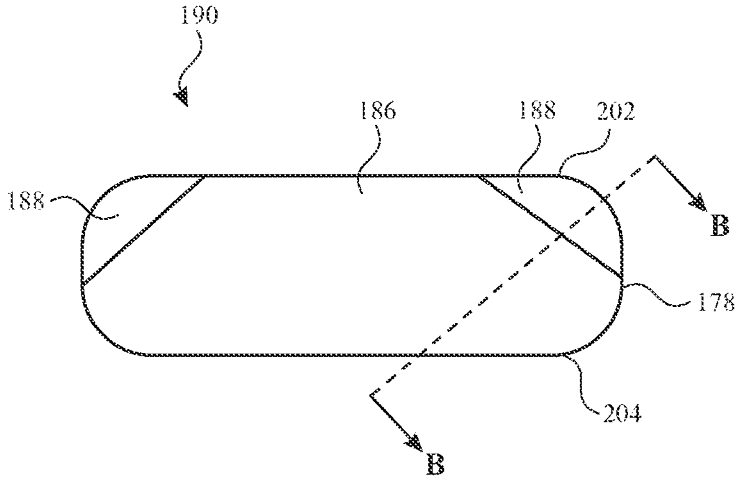
FIG. 23 illustrates a top view of a locking mechanism.
Figure 24:
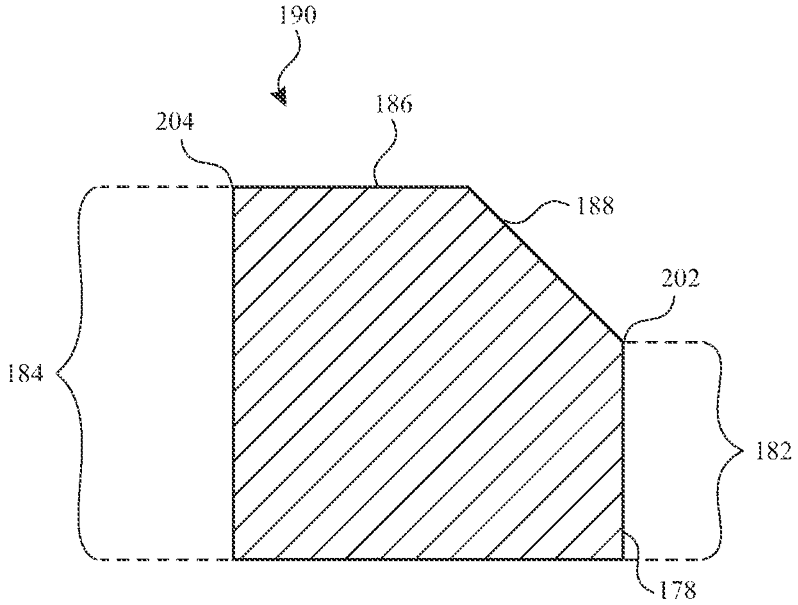
FIG. 24 illustrates a sectional view of a locking mechanism taken at line B-B of FIG. 23.

Referring now to FIGS. 23 and 24, a locking mechanism can provide features that facilitate passage and/or securement of an attachment element with respect to a watch housing. Such a locking mechanism can interact with the watch housing in a manner that allows it to be easily attached with minimal user interaction and secured automatically.

FIG. 23 illustrates a top view of a locking mechanism. The locking mechanism 190 can define a top surface 186 that extends along a substantial portion of the outer periphery of the locking mechanism 190. The top surface 186 can define and extent to which the locking mechanism 190 protrudes out of and away from an attachment element. The top surface 186 can be substantially planar. Additionally or alternatively, the top surface 186 can have a shape that substantially conforms to or otherwise as complementary with an opposing surface at a wall of a channel.

The locking mechanism 190 can further define one or more lateral surfaces 178. The lateral surfaces 178 can extend from and/or away from the top surface 186 at one or more edges thereof. The lateral surfaces 178 can be flat, planar, curved, or combinations thereof. At least a portion of the lateral surfaces 178 can be orthogonal to the top surface 186. The lateral surfaces 178 can face in a direction of travel of the locking mechanism 190 and/or a corresponding attachment element when moved within a channel of a watch housing. Accordingly, the lateral surfaces 178 can interact with one or more other surfaces of the watch housing to provide, for example, securement of the watchband with respect to the watch housing.

The locking mechanism 190 can further define one or more sloped surfaces 188. The sloped surfaces 188 can extend from the top surface 186 and/or the lateral surfaces 178. The sloped surfaces 188 can be flat, planar, curved, or combinations thereof. At least a portion of the sloped surfaces 188 can form a non-zero angle with respect to the top surface 186 and/or the lateral surfaces 178. For example, the sloped surfaces 188 can join a portion of the top surface 186 to a portion of the lateral surfaces 178 while forming a non-zero angle with each. The lateral surfaces 178 can face in a direction with a component (e.g., within a plane of movement) thereof that is in a direction of travel of the locking mechanism 190 and/or a corresponding attachment element when moved within a channel of a watch housing. The direction can have another component (e.g., orthogonal to the plane of movement) that is orthogonal to the top surface 186. As such, the direction in which the sloped surface 188 faces can form a slope, wedge, or another shape that transitions forces along the direction of movement into forces orthogonal to the direction of movement. Such resulting forces can cause forces applied to the sloped surface 188 to move the locking mechanism 190 into an attachment element. Accordingly, the sloped surfaces 188 can interact with one or more other surfaces of the watch housing to provide, for example, actuation of the locking mechanism 190.

As further shown in FIG. 23, the locking mechanism 190 can define an inner side 202 and an outer side 204. On the inner side 202, the top surface 186 can be joined to the lateral surfaces 178 by one or more sloped surfaces 188. On the outer side 204, the top surface 186 can meet (e.g., intersect) the lateral surfaces 178 directly. By providing the sloped surfaces 188 on a side that is different from another side, the housing of the watch body can interact with the locking mechanism 190 in different ways. For example, when an attachment element is being inserted within a channel, the housing can actuate the locking mechanism 190, and when the attachment element is fully within the channel, the housing can receive the locking mechanism 190 to lock the attachment element within the channel.

FIG. 24 illustrates a sectional view of a locking mechanism taken at line B-B of FIG. 23. As shown in FIG. 24, the locking mechanism 190 can provide different shapes on different sides thereof. For example, the locking mechanism 190 can have a first height 182 at the inner side 202 thereof, and the locking mechanism 190 can have a second height 184 at the outer side 204 thereof. The first height 182 at the inner side 202 can be less than the second height 184 at the outer side 204. For example, the sloped surface 188 can transition from the full height (e.g., second height 184) from the top surface 186 to the lower height (e.g., first height 182) along the lateral surface 178. Such heights can refer to the height of the entirety of the locking mechanism and/or a portion of the locking mechanism that protrudes from a surface of an attachment element.

Referring now to FIGS. 25-30, the attachment element can facilitate attachment, securement, and release of a watch band with respect to a watch housing by movement of the locking mechanism within the attachment element. While various configurations are illustrated herein, it will be understood that the system can optionally transition from one configuration to another in any order and/or with additional steps.

Figure 25:
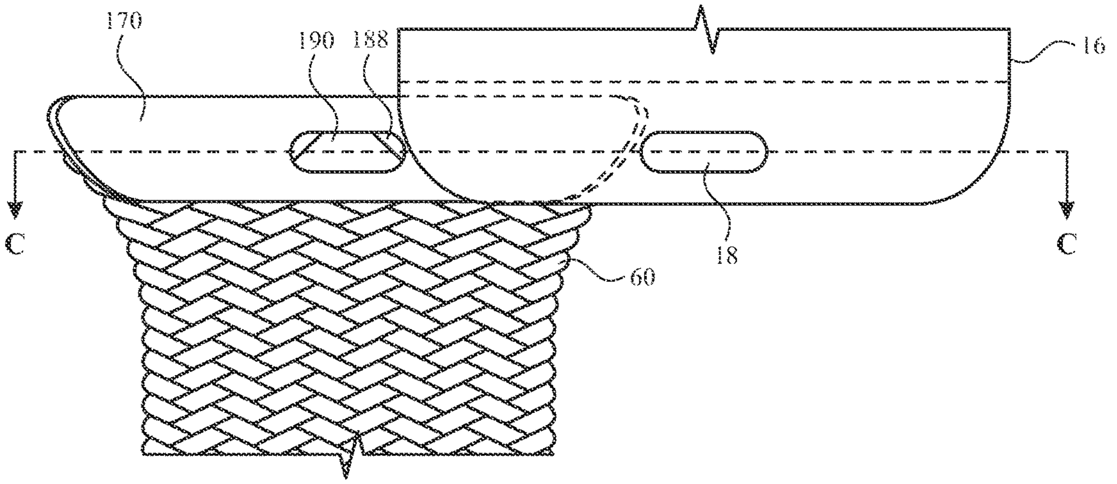
FIG. 25 illustrates a top view of a watch band and housing.
Figure 26:
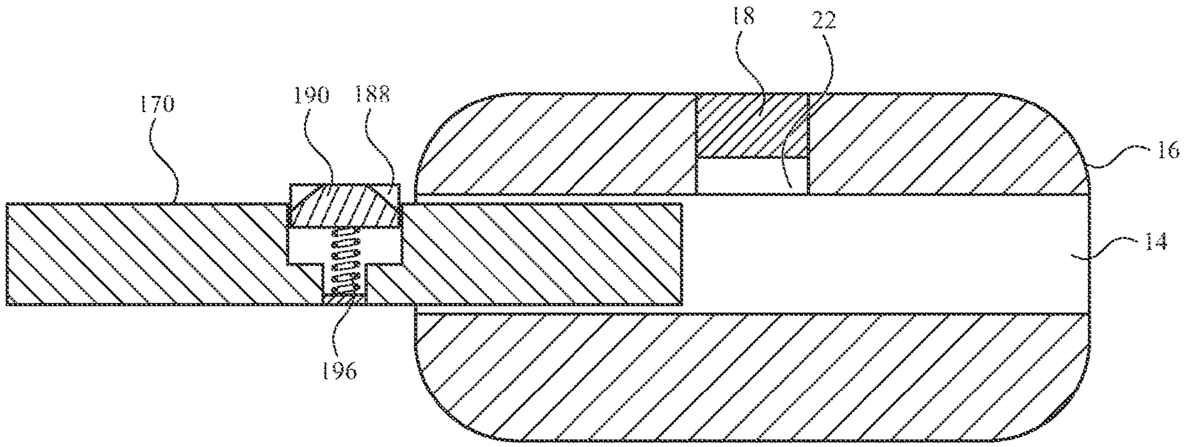
FIG. 26 illustrates a sectional view of a watch band and housing taken at line C-C of FIG. 25.

FIG. 25 illustrates a top view of a watch band and housing, and FIG. 26 illustrates a sectional view of a watch band and housing taken at line C-C of FIG. 25. As shown, the attachment element 170 can be partially inserted into the channel 14 defined by the housing 16 of the watch body. While the locking mechanism 190 is outside of the channel 14, the locking mechanism 190 can be biased by a spring element 196 to a first configuration in which it is extended to protrude beyond a surface of the attachment element 170.

As the attachment element 170 is further advanced through the channel 14, the locking mechanism 190 can contact the housing 16 to be actuated thereby. For example, the sloped surface 188 of the locking mechanism 190 can come into contact with the housing 16 before any other portion of the locking mechanism 190 (e.g., the lateral surfaces 178). By further example, the sloped surface 188 and the portion of the housing 16 that provides contact can have complementary shapes. Both an edge of the sloped surface 188 (e.g., at the top surface) and the edge of the housing 16 can extend in directions that are oblique to a direction of travel of the attachment element 170 within the channel 14. Accordingly, the edge of the housing 16 can contact the sloped surface 188 on the inner side of the locking mechanism 190, rather than a lateral surface of the locking mechanism 190. Such contact can actuate the locking mechanism 190 and cause it to retract within (e.g., move into) the attachment element 170. It will be understood that such actuation need not require direct input from a user, such a force applied directly to the locking mechanism. Instead, the mere sliding of the attachment element 170 within the channel can provide contact with the housing 16 to facilitate the actuation that is required to allow entry of the locking mechanism 190 into the channel.

Figure 27:
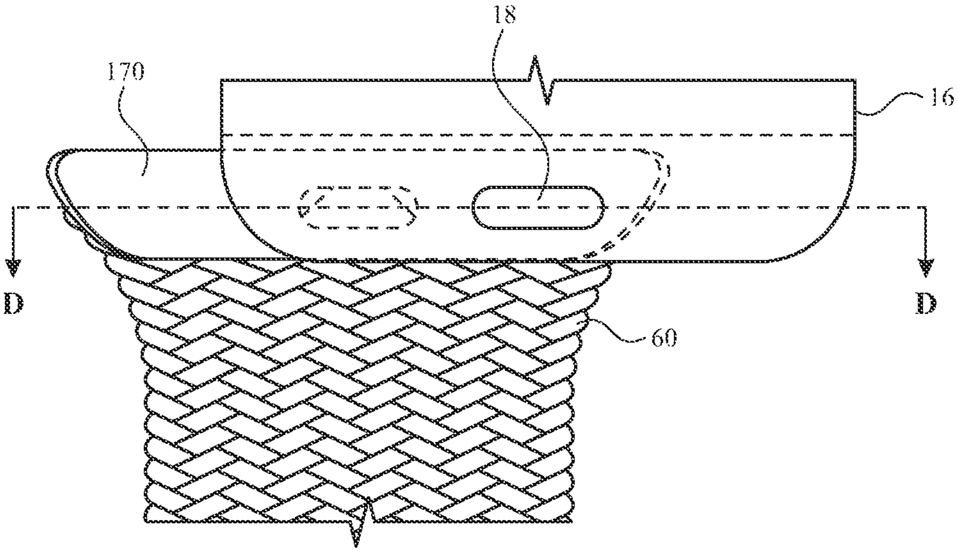
FIG. 27 illustrates a top view of a watch band and housing.
Figure 28:
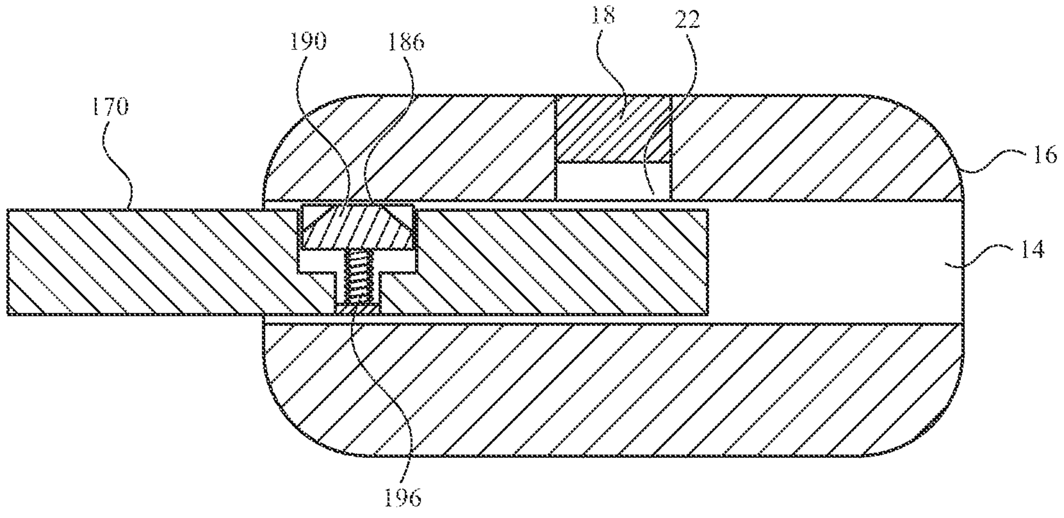
FIG. 28 illustrates a sectional view of a watch band and housing taken at line D-D of FIG. 27.

FIG. 27 illustrates a top view of a watch band and housing, and FIG. 28 illustrates a sectional view of a watch band and housing taken at line D-D of FIG. 27. As shown, the attachment element 170 can be further, yet still only partially, inserted into the channel 14 defined by the housing 16 of the watch body. While the locking mechanism 190 is within the channel 14, yet not within the recess 22, the locking mechanism 190 can be biased by the spring element 196 to a second configuration in which it abuts a wall on an inner surface of the channel 14 (e.g., with the top surface 186). The second configuration of the locking mechanism 190 can be one in which the locking mechanism 190 protrudes beyond the attachment element 170 to a lesser extent than it does in the first configuration. Optionally, the locking mechanism 190 (e.g., at the top surface 186) can be flush with the attachment element 170.

Figure 29:
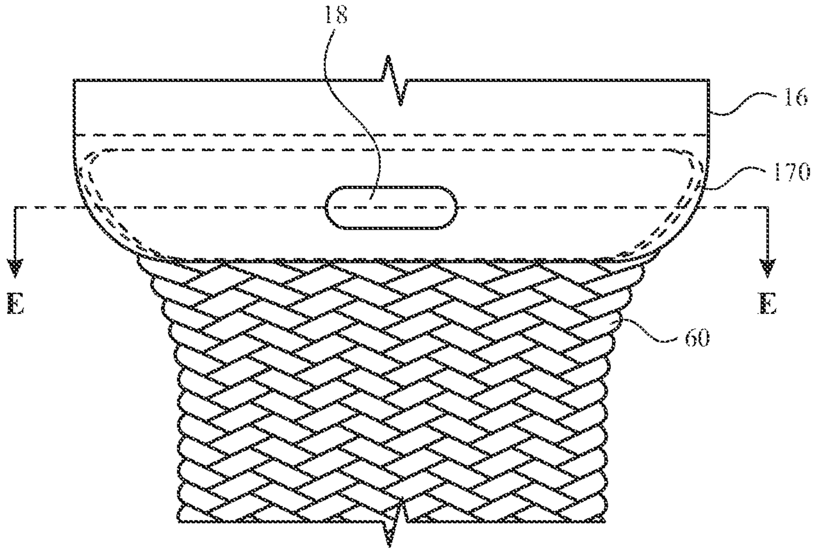
FIG. 29 illustrates a top view of a watch band and housing.
Figure 30:
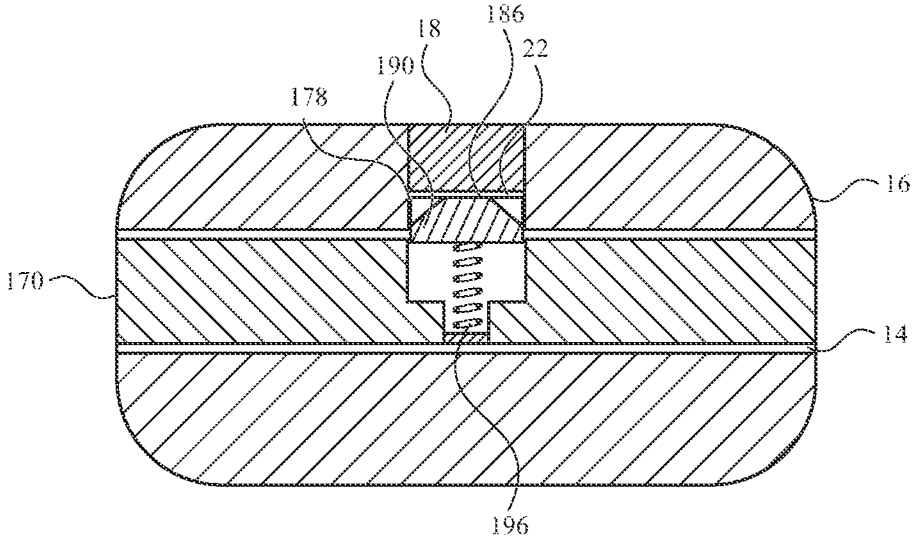
FIG. 30 illustrates a sectional view of a watch band and housing taken at line E-E of FIG. 29.
Figure 31:
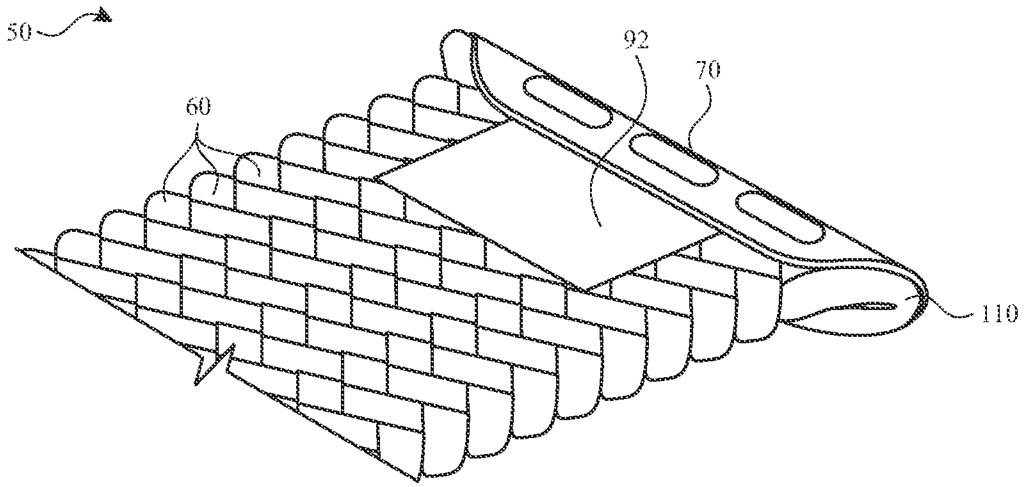
FIG. 31 illustrates a perspective view of a watch band.
Figure 32:
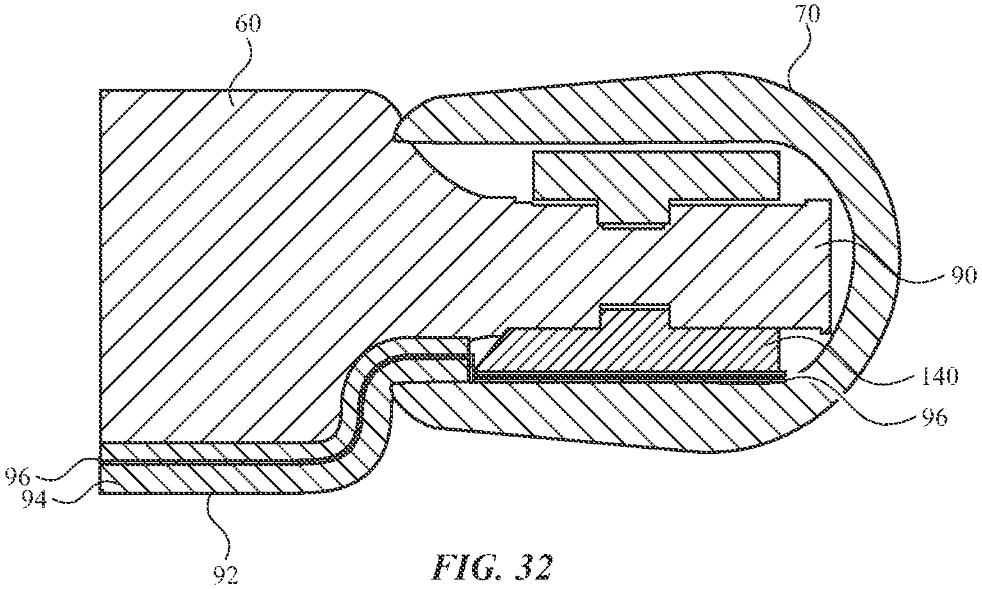
FIG. 32 illustrates a sectional view of the watch band of FIG. 31.

FIG. 29 illustrates a top view of a watch band and housing, and FIG. 30 illustrates a sectional view of a watch band and housing taken at line E-E of FIG. 29. As shown, the attachment element 170 can be fully inserted into the channel 14 defined by the housing 16 of the watch body. The locking mechanism 190 can be biased by the spring element 196 to extend into the recess 22 and/or against a release button 18 within the recess 22. The third configuration of the locking mechanism 190 can be one in which the locking mechanism 190 protrudes beyond the attachment element 170 to a greater extent than it does in the second configuration and/or an equal extent as compared to the first configuration.

While within the recess 22, the locking mechanism 190 can contact the housing 16 to be secured thereby. For example, the lateral surfaces 178 of the locking mechanism 190 can come into contact with the housing 16 before any other portion of the locking mechanism 190 (e.g., the sloped surfaces 188) when lateral forces are applied to the attachment element 170. By further example, the lateral surfaces 178 and the portion of the housing 16 that defines the recess 22 can face opposite each other. As a force is applied that tends to move the attachment element 170, the lateral surfaces 178 of the locking mechanism 190 in the third configuration (e.g., extended within the recess 22) abut the housing 16 and prevent movement.

When the release button 18 is actuated, it can provide a force to the locking mechanism 190 to move (e.g., retract) it to be within or more towards the attachment element 170. Such a configuration can be similar to the second configuration of the locking mechanism 190. In such a configuration, the lateral surfaces 178 of the locking mechanism 190 do not abut the housing 16, but instead allow movement of the attachment element 170 within the channel 14. The user can then remove the attachment element 170 from the channel and the band from the watch body.

Accordingly, the arrangement described herein allows a watch band to be attached, secured, released, and removed from a watch body without requiring complex actions from a user. The sliding of the attachment element provides automated passage and entry into the channel, and the release button allows easy release of the watch band. Furthermore, such an arrangement allows the locking mechanism to be positioned on only one side of the attachment element, so that other portions of the band (e.g., braided strands) can be within the attachment element and extending across the locking mechanism.

Referring now to FIGS. 23 and 24, a watch band can be provided with a surface feature at an end portion thereof. As shown in FIG. 23, a surface feature 92 can optionally be provided as extending from the attachment element 70 and along a surface of the strands 60 of the watch band 50. The surface feature 92 can extend any length from the attachment element 70. While the surface feature 92 of FIG. 23 is shown extending only the width of a few strands 60, the surface feature 92 can optionally extend any distance, including to an opposing attachment element 70 at an opposing end of the watch band 50. The surface feature 92 can be a feature that provides information and/or an aesthetic design. Additionally or alternatively, the surface feature 92 can be a feature that provides structural support and/or enhances a user's comfort while wearing the watch band 50.

The surface feature 92 can be directly or indirectly coupled to the strands 60 of the watch band 50. For example, in addition to an engagement with the attachment element 70, the surface feature 92 can be bonded to one or more of the strands 60 so that it remains substantially fixed against an outer surface of the watch band 50 along its length. The surface feature 92 can have an elasticity that is similar to an elasticity of the strands 60 of the watch band 50, so that the surface feature 92 can move with the strands 60 and maintain its bond therewith. Alternatively, the portion of the surface feature 92 that is outside the attachment element 70 can be free of the strands 60. Accordingly, the surface feature 92 can move away from the strands 60 by flexing, bending, or otherwise pivoting at an interface with the attachment element 70.

As shown in FIG. 24, the attachment element 70 can be provided over the strands 60, the binder 90, and a portion of the surface feature 92. The surface feature 92 can include one or more layers. For example, the surface feature 92 can include outer layers 94 that define an outer periphery of the surface feature 92. The outer layers 94 can define an outer surface of the surface feature 92. The outer layers 94 can include a soft textile, such as microfiber, suede, silk, cotton, and the like. The textile can optionally be laminated to a structural core, for example with an adhesive (e.g., heat-activated adhesive). At least a portion of the outer layers 94 can be within the attachment element 70. By further example, the surface feature 92 can further include an inner layer 96 between the outer layers 94. The inner layer 96 can include a thin structural film, textile, woven material, non-woven material, and/or laminate. The inner layer 96 can include, for example, polymers, synthetic fabrics, woven glass fibers, and the like. At least a portion of the inner layer 96 can be within the attachment element 70. For example, a portion of the inner layer 96 can extend beyond a terminal end of the outer layers 94 and couple to the attachment element 70.

The surface feature 92 can be coupled to the attachment element 70 within an interior portion thereof. The binder 90, the intermediate element 140, and/or the inner layer 96 of the surface feature 92 can be secured within the interior portion of the attachment element 70 by one or more of a variety of mechanisms. For example, an adhesive (e.g., heat-activated adhesive) can be provided to bind two or more of these components together. Other mechanisms, such as welding and/or other mechanical attachment, are contemplated. Such mechanisms can be fixed or detachable. Such mechanisms can be contained entirely within the interior portion of the attachment element 70 to be hidden from view. By further example, the inner layer 96 and/or another portion of the surface feature 92 can be positioned between two or more structures, such as the attachment element 70 and the intermediate element 140. Where the inner layer 96 can be coupled to the attachment element 70, the outer layers 94 can be coupled to the attachment element 70 only via the inner layer 96. The inner layer 96 can provide adequate tensile strength and structural support to anchor the entire surface feature 92 to the attachment element 70.

Accordingly, embodiments of the present disclosure provide a stretchable watch band having braided strands that provide a comfortable fit around the wrist of the user. The watch band can stretch and conform to the user based on the elasticity within each strand and based on the ability of the strands to move relative to each other. Additionally, end sections of the watch band can include attachment elements that securely connect the watch band to a housing of the watch. The end section can be configured to releasable connect to the housing in a manner that is reliable and easy for a user. Additionally, the watch band can provide a smooth transition from the size and/or shape of the housing to a size and/or shape of a continuous section of the watch band. Additionally, the watch band can conceal portions thereof other than the braided strands when connected to the housing of the watch.

Various examples of aspects of the disclosure are described below as clauses for convenience. These are provided as examples, and do not limit the subject technology.

Clause A: a watch band comprising strands braided together to form: an end section for residing within a channel formed in a housing of a watch and having a first width that is within the channel; a taper section for residing outside the channel and extending away from the end section; and an extension section extending away from the taper section and having a second width that is substantially uniform along a length of the extension section, wherein the taper section tapers from the first width to the second width along a length of the taper section that is outside the channel.

Clause B: a watch band comprising: an attachment element for engaging a channel formed in a housing of a watch; and strands braided together, at least some of the strands being secured partially within an interior portion of the attachment element, wherein when the attachment element is within the channel, the housing and the strands entirely surround the attachment element.

Clause C: a watch band comprising: an attachment element for connecting the watch band to a housing of a watch; multiple strands braided together and extending from within the attachment element; and an anchor element extending from within one of the strands, the anchor element being secured to the attachment element.

Clause D: a watch comprising: a watch body comprising: a housing; a channel; a recess; and a button within the recess; a watch band comprising: a band portion; an attachment element for insertion into the channel; a locking mechanism moveable within the attachment element, wherein, as the attachment element is partially inserted into the channel, the housing is configured to engage a sloped surface of the locking mechanism to move the locking mechanism into the attachment element, and wherein, as the locking mechanism is within the recess, the housing is configured to engage a lateral surface of the locking mechanism to limit movement of the attachment element within the channel.

Clause E: a watch band comprising: an attachment element for insertion into a channel of a housing; a locking mechanism moveable within the attachment element between: a first configuration with a sloped surface of the locking mechanism protruding from a surface of the attachment element; a second configuration with a top surface of the locking mechanism biased against a wall of the channel, wherein the locking mechanism is configured to transition from the first configuration to the second configuration by engaging the housing with the sloped surface, the sloped surface extending from the top surface; and a third configuration with the locking mechanism extended into a recess of the watch housing.

Clause F: a watch band comprising: a band portion; a locking mechanism at an end of the band portion, the locking mechanism comprising: a top surface; a lateral surface, wherein the top surface meets the lateral surface on an outer side of the locking mechanism; a sloped surface, wherein the sloped surface joins the top surface to the lateral surface on an inner side of the locking mechanism.

One or more of the above clauses can include one or more of the features described below. It is noted that any of the following clauses may be combined in any combination with each other, and placed into a respective independent clause, e.g., clause A, B, C, D, E, or F.

Clause 1: an attachment element for engaging the channel of the housing of the watch, at least a portion of the end section being positioned within an interior portion of the attachment element.

Clause 2: the strands comprise outer strands that are coupled to opposing sides of the attachment element and define the first width of the end section.

Clause 3: the strands are arranged with a first strand density in the end section and a second strand density in the extension section, the first strand density being lower than the second strand density.

Clause 4: the strands are arranged with a first pitch angle in the end section and a second pitch angle in the extension section, the first pitch angle being greater than the second pitch angle.

Clause 5: the strands are arranged with a same number of strands across the first width and across the second width.

Clause 6: the taper section is at least 5 mm in length.

Clause 7: a binder that bonds the strands to each other in the end section, wherein the strands in the extension section are free to move relative to each other.

Clause 8: the first width is greater than the second width.

Clause 9: the strands comprise outer strands that are coupled to opposing sides of the attachment element and configured to occupy opposing ends of the channel when the attachment element is within the channel.

Clause 10: the attachment element of the watch band is configured to slide laterally with the channel until locked relative to the housing.

Clause 11: when the attachment element is within the channel, no portion of the attachment element is outside the channel and outer surfaces of the attachment element are covered by the housing and the strands.

Clause 12: the anchor element comprises a straight portion outside the one of the strands and a curved portion within the one of the strands.

Clause 13: the anchor element is a first anchor element, the watch band further comprising a second anchor element extending from within another one of the strands, the second anchor element being secured to the attachment element on a side opposite the first anchor element.

Clause 14: an intermediate element positioned within the attachment element and coupling the strands to the attachment element.

Clause 15: an engagement element coupling the anchor element to the intermediate element.

Clause 16: a locking mechanism extending through openings of the attachment element and the intermediate element, the locking mechanism being configured to securely engage the housing of the watch.

Clause 17: the one of the strands comprises: core filaments; and outer threads braided together about the core filaments and a portion of the anchor element.

Clause 18: the one of the strands conforms to a shape of the anchor element such that the one of the strands forms a loop.

Clause 19: the watch band further comprises a spring element biasing the locking mechanism away from the attachment element.

Clause 20: the sloped surface forms a chamfer joining a top surface of the locking mechanism to the lateral surface.

Clause 21: the locking mechanism is configured to protrude on only one side of the attachment element.

Clause 22: the button is biased away from the locking mechanism and moveable within the recess to push the locking mechanism into the attachment element.

Clause 23: the locking mechanism defines: an outer side facing the band portion and having a first height; and an inner side opposite the outer side and having a second height, less than the first height.

Clause 24: the housing is configured to engage the sloped surface of the locking mechanism with an edge that is at an oblique angle with respect to a direction of travel of the attachment element within the channel.

Clause 25: the locking mechanism further defines a lateral surface configured to engage the recess while the locking mechanism is in the third configuration.

Clause 26: the chamfer joins the top surface to form an edge that is at an oblique angle with respect to a direction of travel of the attachment element within the channel.

Clause 27: braided strands that are positioned within the attachment element and across the locking mechanism, the braided strands extending out of and away from the attachment element.

Clause 28: an attachment element, the locking mechanism being moveable within the attachment element; and a spring element biasing the locking mechanism away from the attachment element.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans can implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A watch band comprising:
strands braided together to form:
an end section for residing within a channel formed in a housing of a watch; and
an extension section extending away from the end section;
an intermediate element;
a plate element, wherein at least a portion of the end section is positioned between the intermediate element and the plate element; and
an attachment element for engaging the channel of the housing of the watch, wherein at least a portion of the end section, the intermediate element, and the plate element are within the attachment element.

2. The watch band of claim 1, further comprising pins extending from the intermediate element to the plate element, the pins extending through the end section.

3. The watch band of claim 1, further comprising a locking mechanism that extends through the attachment element and a portion of the intermediate element.

4. The watch band of claim 3, further comprising a spring configured to bias the locking mechanism away from the portion of the intermediate element.

5. The watch band of claim 1, wherein the strands comprise outer strands that are coupled to opposing sides of the attachment element and define a width of the end section.

6. The watch band of claim 1, wherein the strands are arranged with a first strand density in the end section and a second strand density in the extension section, the first strand density being lower than the second strand density.

7. The watch band of claim 1, wherein the strands are arranged with a first pitch angle in the end section and a second pitch angle in the extension section, the first pitch angle being greater than the second pitch angle.

8. The watch band of claim 1, wherein the strands are arranged with a same number of the strands in the end section and the extension section.

9. The watch band of claim 1, further comprising a binder that bonds the strands to each other in the end section, wherein the strands in the extension section are free to move relative to each other.

10. A watch band comprising:
strands braided together to form:
an end section for residing within a channel formed in a housing of a watch; and
an extension section extending away from the end section;
an intermediate element;
anchor elements coupling an outermost pair of the strands to the intermediate element;
an attachment element over portions of the strands forming the end section, the intermediate element, and portions of the anchor elements; and
a locking mechanism extending between the strands at the end section and protruding beyond an outer surface of the attachment element.

11. The watch band of claim 10, wherein when the attachment element is within the channel, the housing and the strands entirely surround the attachment element.

12. The watch band of claim 10, wherein the anchor elements each extend from within a corresponding one of the outermost pair of the strands.

13. The watch band of claim 10, wherein each of the anchor elements comprises a straight portion outside a corresponding one of the outermost pair of the strands and a curved portion within the corresponding one of the outermost pair of the strands.

14. The watch band of claim 10, wherein the locking mechanism is moveable within the end section to be flush with the outer surface of the attachment element.

15. A watch band comprising:
- strands braided together to form:
  - an end section for residing within a channel formed in a housing of a watch; and
  - an extension section extending away from the end section;
- an intermediate element;
- engagement elements extending from the intermediate element;
- anchor elements each extending from a corresponding outermost one of the strands to within a corresponding one of the engagement elements; and
- an attachment element over portions of the strands forming the end section, the intermediate element, and portions of the anchor elements.

16. The watch band of claim 15, wherein each of the anchor elements extends from within the corresponding outermost one of the strands.

17. The watch band of claim 15, wherein the anchor elements each comprise a straight portion outside the one of the strands and a curved portion within the one of the strands.

18. The watch band of claim 15, wherein comprising a locking mechanism extending through openings of the attachment element and the intermediate element, the locking mechanism being configured to securely engage the housing of the watch.

19. The watch band of claim 18, wherein the locking mechanism is moveable within the end section to be flush with an outer surface of the attachment element.

20. The watch band of claim 18, further comprising a spring element configured to bias the locking mechanism to protrude beyond an outer surface of the attachment element.

* * * * *